(12) United States Patent
Lu et al.

(10) Patent No.: US 9,430,141 B1
(45) Date of Patent: Aug. 30, 2016

(54) ADAPTIVE ANNOTATIONS

(71) Applicant: Amazon Technologies, Inc., Reno, NV (US)

(72) Inventors: Michael James Lu, Seattle, WA (US); Allison Bhang, Seattle, WA (US); Andrew Scott Craft, Seattle, WA (US); Andrew Olcott, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 248 days.

(21) Appl. No.: 14/320,890

(22) Filed: Jul. 1, 2014

(51) Int. Cl.
*G06F 17/00* (2006.01)
*G06F 3/0488* (2013.01)
*G06F 17/24* (2006.01)

(52) U.S. Cl.
CPC ......... *G06F 3/04883* (2013.01); *G06F 17/241* (2013.01)

(58) Field of Classification Search
CPC ........................... G06F 17/241; G06F 3/04883
See application file for complete search history.

(56) References Cited

PUBLICATIONS

Shilman et al., "Recognizing Freeform Digital Ink Annotations", http://www.shilman.net/papers/shilman_annotations_das04.pdf, 12 pgs.
"Podcast: Suzanne Napoleon, FOSI Expert", single-sourcing solutions, inc., http://podcast.single-sourcing.com/2009/11/podcast-fosiexpert/, 4 pgs.

*Primary Examiner* — Stephen Hong
*Assistant Examiner* — Marshon Robinson
(74) *Attorney, Agent, or Firm* — Lee & Hayes, PLLC

(57) ABSTRACT

Described herein are techniques for adding adaptive annotations to an electronic content item. For example, a user may insert an annotation by hand drawing the annotation over the content of the content item, in white space around the content, or within an annotation window. The user may also anchor, associate, or link annotations to particular portion of the content item, such that when the content is displayed or rendered on a display of an electronic device, the annotation appears in-line with the content and adjacent to the associated portion.

20 Claims, 32 Drawing Sheets

2700

2510

EXTEND THE CIRCLE FROM THE LEFT EDGE OF THE DISPLAY TO THE RIGHT EDGE OF THE DISPLAY
2702

ASSOCIATE THE HAND DRAWN CIRCLE WITH A PORTION OF THE CONTENT ITEM
2704

REPLACE THE HAND DRAWN CIRCLE WITH A PROCESSED CIRCLE
2706

FIG. 27

ADAPTIVE ANNOTATIONS

BACKGROUND

A large and growing population of users is enjoying entertainment through the consumption of digital content, such as music, movies, images, electronic books, and so on. The users employ various devices with electronic displays such as electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth to view the digital content. For many consumers, the ability to annotate and/or take notes and opinions regarding the digital content that they have consumed is important. However, unlike traditional print materials, digital content displayed on electronic devices, typically have little white space in the margins, as the electronic devices attempt to present the largest amount of content possible. Due to the limited white space associated with digital content, annotating digital content items is often difficult and frustrating experience for consumers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 27 illustrates an example flow diagram showing an illustrative process for emphasizing a portion with a circle.

DETAILED DESCRIPTION

Figure 1:
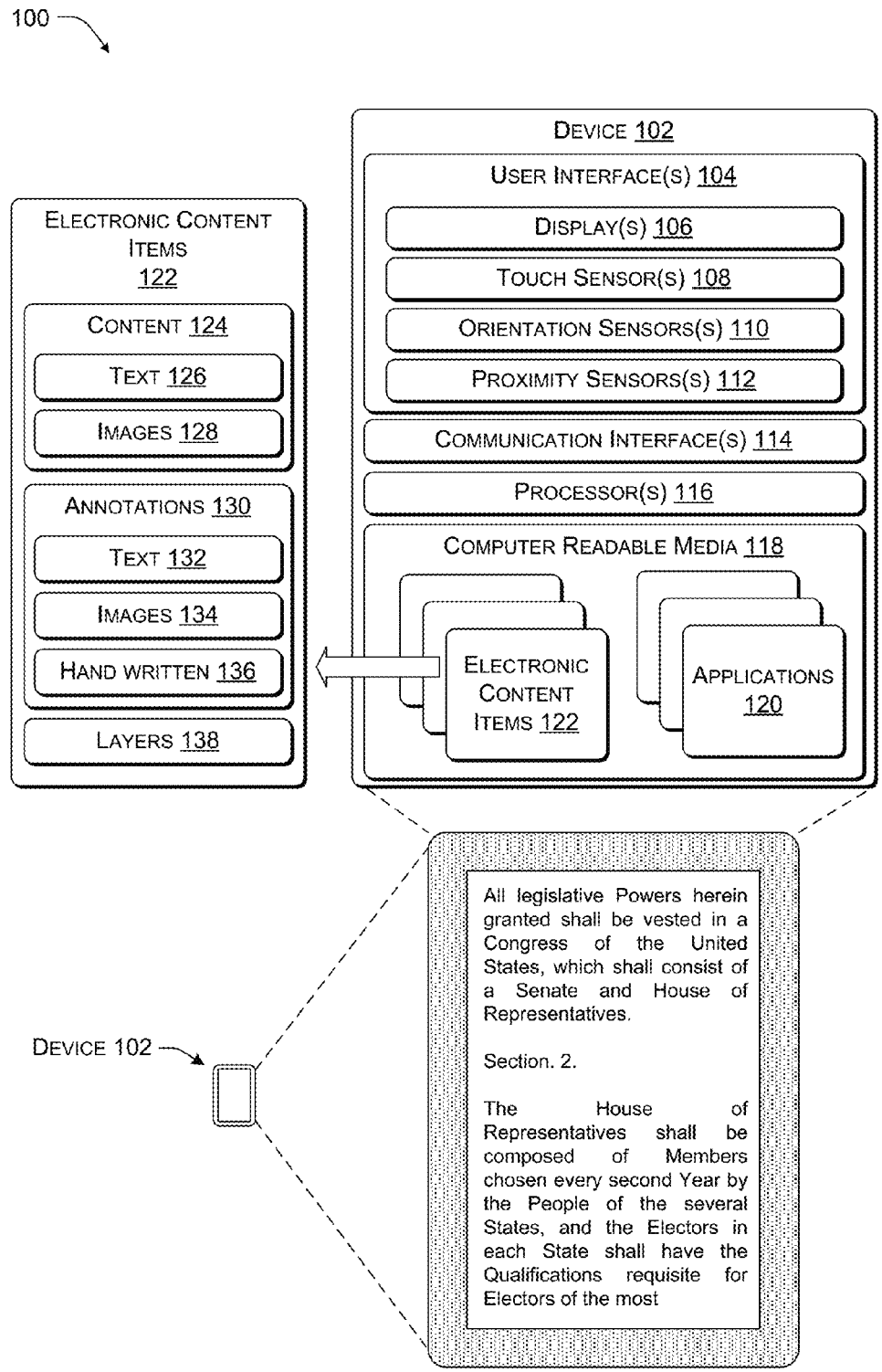
FIG. 1 illustrates an example architecture of a device configured to provide adaptive annotations.

Described herein are devices and techniques for adding annotations to electronic content items. For instance, in some examples, the user may be able to write an annotation and associate, link, or anchor the annotation with a particular portion of the content item. In some implementations, the annotation may be located or placed adjacent to the associated portion of the content item and the content being displayed may be reflowed around the annotation, such that the annotation may be displayed in-line with the content. In this manner, adaptive annotations are provided to allow the user to seamlessly view annotation in-line with the content and adjacent to the associated portion of the content item while consuming electronic content items on different devices or at different orientations of the same device (e.g., vertical v. horizontal).

In some examples, a user may insert an annotation by either writing directly over the content, adjacent to the content item (e.g., within available white space), or via an annotation window. For instance, in one implementation, a user may tap a stylus or other input device on a portion of the content item to cause an annotation icon to appear. The user may then select the annotation icon to open the annotation window, write out the notes or comments to be included in the annotation in the window, and close the annotation window. In response, the device may locate the annotation adjacent to the portion of the content item. In another instance, the user may write directly over the content item and when the user has finished inputting the annotation, the electronic device may draw a bounding box around the annotation, select a corner of the bounding box, located the nearest content to the selected corner and anchor the annotation to the located content. In either instance, once the annotation is located or anchored to a portion of the content, the electronic device may reflow the content around the location of the annotation (for example, in response to a page turn), such that the user may view the annotation adjacent to or in-line with the associated portion of the content.

In other examples, the user may emphasize a portion of the content item. For instance, in one implementation, the user may underline, circle, or bracket a portion of the content displayed. The electronic device may then translate the underline, circle, or bracket into a machine generated or processed underline or highlight to, thereafter provide easily viewable emphasis to the selected portion of the content item. In some cases, the user may also associate hand written annotations with the emphasized portion. For example, by selecting an annotation icon presented by the electronic device in association with the emphasized portion or by creating the annotation and manually linking or anchoring the annotation to the emphasized portion.

In some implementations, the user may flag or mark selected portions of the content item in addition to emphasizing the content. For example, the user may draw a star, exclamation point, or other distinguishing mark on or adjacent to a portion of the content item. The electronic device may recognize the mark and, in response emphasize the portion of the content, as well as apply the flag or mark (e.g., the start or exclamation point) as an annotation adjacent to and associated with the portion of the content item. In some specific implementation, the user may flag or mark multiple portions with the same distinguishing mark and/or link multiple portions with to the same mark. In this implementation, the electronic device may present one or more views in which the user may browse a list of the content flagged with one or more distinguishing marks.

For instance, in some specific implementations, a touch sensor and/or other input controller may detect a user input and associate the user input with an x/y coordinate of the display of the electronic device. The electronic device may compare and/or map the x/y coordinate received from the touch sensor with coordinates associated with the content currently rendered on the display as received from a display controller. In some cases, by comparing the x/y coordinate of the user input with the locations and coordinates of the content currently rendered on the display, the electronic device is able to determine an association between the content rendered on the display and the location of the user input and, thereby infer a type associated with the input (e.g., a free form annotation, an underline, a circle, a flag or marker, etc.) an intent of the user to associate the user input with particular portions of the content (e.g., a section of text, caption, white space, etc.) or directly with the particular content rendered on the display (e.g., a word, letter, title, image, etc.).

FIG. 1 illustrates an example architecture 100 of a device 102 configured to provide adaptive annotations. In general, the device 102 may be implemented as any type of electronic device capable of detecting a user input. For example, the device 102 may include electronic devices, such as a cell phone, smart phone, tablets, general purpose computer, electronic reader, among other type of known computing devices.

The device 102, generally, includes one or more user interfaces 104 for presenting information or data and for receiving user inputs. The user interfaces 104 may include one or more output components, such as a display or touch screen, and one or more input components, such as keyboards, keypads, joysticks, a mouse, a touch screen, touch pad, drawing pad, or control buttons. In some implementations, the output components and input components are combined in a single user interface 104 to provide a touch-sensitive display, or touch screen display. For instance, in the illustrated example, the user interface 104 includes one or more displays 106 for presenting information, such as electronic content items, to a user, one or more touch sensors 108 for accepting input resulting from contact and/or application of incident force, such as a user finger or stylus pressing upon the touch sensor, one or more orientation sensors 110 (e.g., accelerometer, gravimeters, gyroscopes and so forth) for collecting data that may be used to determine the orientation of the device 102 and/or the orientation of a user in regards to the device 102, and/or one or more proximity sensors 112 (e.g., magnetometers, electrical field sensors, etc.) for detecting the orientation and position of an input device, such as the user's finger or stylus, relative to the device 102. In some specific implementations, the device 102 may be configured to receive user inputs by communicating with an active stylus. For example, the active stylus and the device 102 may actively exchange data related to the user inputs.

The touch sensor 108 may be couple to a touch layer (not shown), such as an indium tin oxide (ITO) layer arranged in a grid pattern below the top surface of the display 106. In this case, the touch sensor 108 is configured to determine characteristics of user interaction with the display 106 detected by the ITO layer. These characteristics may include the location of the touch on the display 106, magnitude of the force, shape of the touch, and so forth.

The orientation sensors 110 may include accelerometers, gravimeters, gyroscopes, and so forth. Data from the orientation sensors 110 may be used at least in part to determine the orientation of the user relative to the device 102. Once an orientation is determined, input received by the device 102 may be adjusted to account for the user's position relative to the device 102, as well as to determine an orientation to render content on the display 106. For example, if the orientation sensors 110 determine that the user is holding the device 102 vertically, the device 102 may present content in portrait orientation. Alternatively, if the orientation sensors 110 determine that the user is holding the device 102 horizontally, the device 102 may present content in landscape orientation.

The proximity sensors 112, allows for the detection and characterization of an impinging magnetic field. For example, a magnetometer may be configured to determine a field strength, angular bearing, polarity of a magnetic field. In some implementations, the proximity sensors 112 may include a Hall-effect device to determine the presence, position, orientation, rotation, and so forth of a magnetic field generated by a magnetic stylus coming into proximity with the display 106.

In some implementations, the display 106 may present content in a human-readable format to a user. The display 106 may be reflective, emissive, or a combination of both. Reflective displays utilize incident light and include electrophoretic displays, interferometric modulator displays, cholesteric displays, and so forth. Emissive displays do not rely on incident light and, instead, emit light. Emissive displays include backlit liquid crystal displays (LCDs), time multiplexed optical shutter displays, light emitting diode (LED) displays, and so forth. When multiple displays are present, these displays may be of the same or different types. For example, one display may be an electrophoretic display while another may be a liquid crystal display. In some implementations, multiple displays 106 may be present and/or coupled to the device 102. These multiple displays 106 may be located in the same or different enclosures or panels.

For convenience, the display 106 is shown in FIGS. 1-20 in a generally rectangular configuration. However, it should be understood that the display 106 may be implemented in any shape, and may have any ratio of height to width. Also, for stylistic or design purposes, the display 106 may be curved or otherwise non-linearly shaped. Furthermore, the display 106 may be flexible-and configured to fold or roll.

The device 102 also includes one or more communication interfaces 114 to facilitate communication between one or more networks (such as the Internet® or one or more local area networks), directly with one or more devices, and/or with one or more cloud services (such as the cloud-based discovery service and/or the cloud-based relay service). The communication interfaces 114 may also facilitate communication between one or more wireless access points, a master device, and/or one or more other computing devices as part of an ad-hoc or home network system. The communication interfaces 114 may support both wired and wireless connection to various networks, such as cellular networks, radio, WiFi networks, short-range or near-field networks (e.g., Bluetooth®), infrared signals, local area networks, wide area networks, the Internet, and so forth.

The device 102 includes or accesses components such as at least one or more control logic circuits, central processing units, or processors 116, and one or more computer-readable media 118 to perform the function of the device 102. Additionally, each of the processors 116 may itself comprise one or more processors or processing cores.

Depending on the configuration of the device 102, the computer-readable media 118 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 116.

Various instruction, information, data stores, and so forth may be stored within the computer-readable media 118 and configured to execute on the processors 116. For instance, the computer-readable media 118 may store one or more applications 120 and/or one or more electronic content items 122. In some examples, the applications 120 may include instructions which when executed by the processors 116 cause the device 102 to perform various functions. For example, the applications 120 may include an application to cause the content items 122 to be presented to a user on the user interfaces 104.

In some implementations, one or more of the electronic content items 122 may include content 124, such as text 126, images 128, etc., as well as annotations 130 including processed text 132, images 134, and/or hand written or drawn objects and text 136 related to the content 124. In some specific implementations, the content items 122 may include electronic books or "eBooks." For example, eBooks may include text and any illustrations, tables, or graphic elements that might be contained in a print version of the eBook. In some cases, the content items 122 may include electronic or digital representations of printed works, as well as multimedia objects, hypertext, and/or hypermedia. In other implementations, the content items 122 may include digital copies of magazines, newspapers, periodicals, journals, reference materials, telephone books, textbooks, anthologies, instruction manuals, proceedings of meetings, forms, directories, maps, web pages, and so forth.

In some examples, the content items 122 may store different elements in different layers 136. In some cases, the layers 136 allow the device 102 to render the different elements, such as the content 124 (e.g., the text 126, images 128) and the annotations 130, in various orientations and relations with regards to each other. In some particular examples, by storing the content in layers 136, one or more of the layers 136 may be shared between electronic devices 102 and/or between users of the electronic device 102. For instance, the user may share the annotations 130 (such as notes) made with regards to a particular content item 122 (e.g., a text book) with a classmate whom also has a digital copy of the same electronic content item 122 without the need to transmit (or download) the entirety of the content.

In some implementations, a user may insert an annotation 130 by writing directly over the content 124 displayed, adjacent to content 124 (e.g., within available white space), or via an annotation window (not shown). For instance, one or more of the proximity sensors 112 may detect the presence of a stylus or other input device tapping on a portion of the content item 122 and, in response, the electronic device 102 may cause an annotation icon to appear on the display 106. The touch sensors 108 may then detect a user selection of the annotation icon, for example, by detecting a force applied at the location of the annotation icon, and, in response, the device 102 may open the annotation window. The user may input the annotation 130 by writing in the annotation window and the device 102 may position the annotation at the location the annotation icon was rendered. For example, in some implementations, the touch sensor 108 or the proximity sensor 112 may detect a user input and associate the annotation 130 with an x/y coordinate of the display 106. In this example, the device 102 may compare and/or map the x/y coordinate received from the touch sensor 108 or the proximity sensor 112 with coordinates received from the processor 116 and associated with the content 124 currently rendered on the display 106. The device 102 may then determine an association between the content 124 rendered on the display 106 and the location of the use input to infer an intent of the user to associate the annotation 130 with particular portions of the content 124 (e.g., a section of text 126, captions, white space, etc.) or directly with the particular content rendered on the display (e.g., a word, letter, title, image 128, etc.). Once the annotation 130 is associated with the content 124, the electronic device 102 may reflow the content 124 around the annotation 130 (for example, in response to a page turn or manual refresh) in order to display the annotation 130 adjacent to or in-line with the associated content 124.

In another instance, the user may write directly over the content item (for instance, using a stylus) and when the user has finished inputting the annotation 130, the electronic device 102 may draw a bounding box around the annotation 130, select a corner of the bounding box, identify the nearest content 124 (e.g., nearest text 126 or image 128) to the selected corner, and anchor the annotation 130 to the identified content 124. In some implementations, the bounding box may be visible to the user while in other implementations the bounding box may not be displayed. In some cases, the bounding box may be a parallelogram or any other suitable shape for bounding and positioning the annotation 130. Once the annotation 130 is anchored to the identified content 124, the electronic device 102 may reflow the content 124 around the annotation 130 to display the annotation 130 adjacent to and/or in-line with the identified content 124.

In other examples, the user may emphasize a portion of the content 124. For instance, in one implementation, the user may emphasis a portion of the content 124 by tracing an underline, circle, or bracket around the selected content 124. In some cases, the electronic device 102 may be configured to translate the raw underline, circle, or bracket into a processed underline or highlight to more easily distinguish the selected content 124 to a reader (for example, a reader other than the user that selected the content 124). In some implementations, the one or more annotations 130 may be associated with the emphasized content 124. For example, the annotation 130 and the emphasized content 124 may be associated by selecting both the annotation 130 and the emphasized content 124 and/or by dragging a line linking the annotation 130 to the emphasized content 124.

In other examples, the user may flag or mark selected portions of the content 124, in addition to emphasizing the content 124. For example, the user may draw a star, exclamation point, or other distinguishing mark on or adjacent to a portion of the content 124. The electronic device 102 may recognize the mark and, in response emphasize the selected content 124 and associate a processed flag (e.g., the start or exclamation point) with the selected content 124. In some specific implementation, the user may flag or mark multiple portions of the content item 122 with the same mark and/or link multiple marked portions. In this implementation, the electronic device 102 may present one or more views in which the user may browse a list of the marked content 124.

Figure 2:
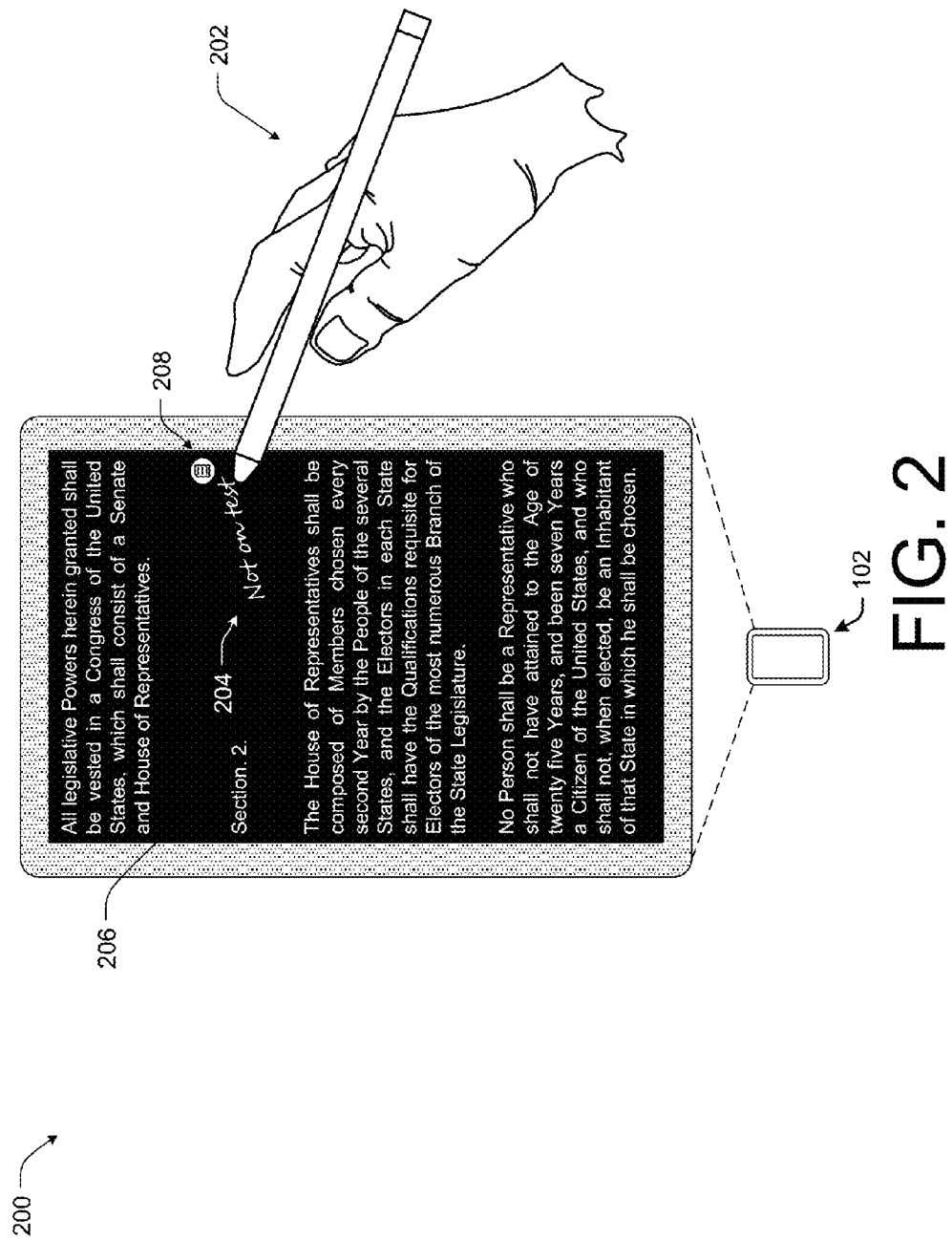
FIG. 2 is an illustrative example of a user inserting an annotation into an electronic content item displayed on an electronic device.

FIG. 2 is an illustrative example 200 of a user 202 inserting an annotation 204 into an electronic content item 206 displayed on an electronic device 102. In the illustrated example, the user is adding a handwritten annotation 204 including the text "not on test" to the content item 206. As shown in the illustrated example, the annotation 204 has been located in the white space between two sections of the content item 206 and, in response to receiving the input of the annotation 204, the device 102 is displaying an annotation icon 208 directly above the annotation 204.

In the illustrated example, the device 102 has also entered a free edit mode in response to detecting the input of the annotation 204. The free edit mode allows the user 202 to continue to add hand-drawn notes to be associated with the annotation 204. For example, the user 202 may add additional hand-drawn notes over some of the content being displayed and the additional hand-drawn notes and the text "not on test" may be stored as a single annotation. In the illustrated example, the device 102 also provides a visual indication to the user 202 to indicate that the free edit mode is active. In this example, the content of the content item 206 and the annotation 204 has turned white and the background or white space had been rendered in black. In other examples, the content may be grayed out and the annotations, such as annotation 204 remain in the original color.

Figure 3:
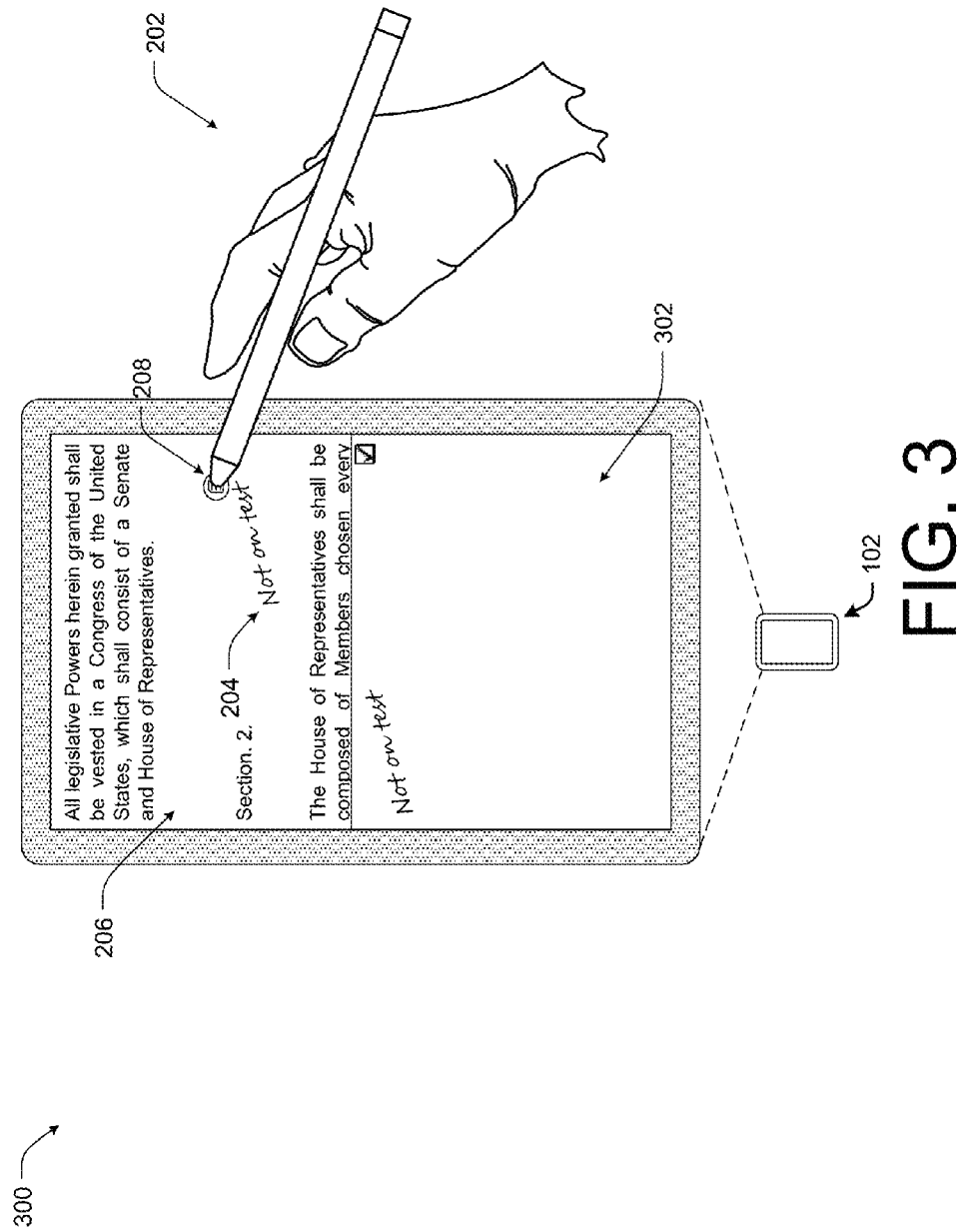
FIG. 3 is an illustrative example depicting the user selecting the annotation icon of FIG. 2 to open an annotation window.

FIG. 3 is an illustrative example 300 depicting the user 202 selecting the annotation icon 208 of FIG. 2 to open an annotation window 302. As illustrated, the text "not on test" of the annotation 204 is displayed within the annotation window 302 at the same orientation that the annotation 204 is displayed with respect to the content item 206. However, in other examples, the text of the annotation 204 may be converted to machine generated text, as well as centered within and/or aligned with a top corner of the annotation window 302. In the illustrated example, the annotation 204 is displayed both on the page with respect to the content of the content item 206 and within the annotation window 302. In other examples, the annotation 204, as well as the annotation icon 208 may be hidden from view when the annotation window 302 displaying the annotation 204 is open.

The annotation window 302 is presented to the user 202 to provide the user 202 with additional white space in which to add additional handwritten notes, comments, and/or drawings to the content item 206, as some devices 102 configured to display electronic content items 206 are configured to minimize white space in order to maximum the amount of content shown on the display at one time. In some cases, the annotation window 302 may be scrollable independent of the content, such that if the user runs out of room within the annotation window 302 the user may drag the white space associated with the annotation window 302 to reveal additional white space for adding hand written notes. In other examples, the content displayed above the annotation window 302 may also be scrollable independent of the annotation window 302, such that the user may view the content covered or hidden by the annotation window 302 when adding hand written notes. Thus, without the ability to open an annotation window 302 as shown, the user 202 is forced to write directly over the displayed content, which may be difficult to read.

Figure 4:
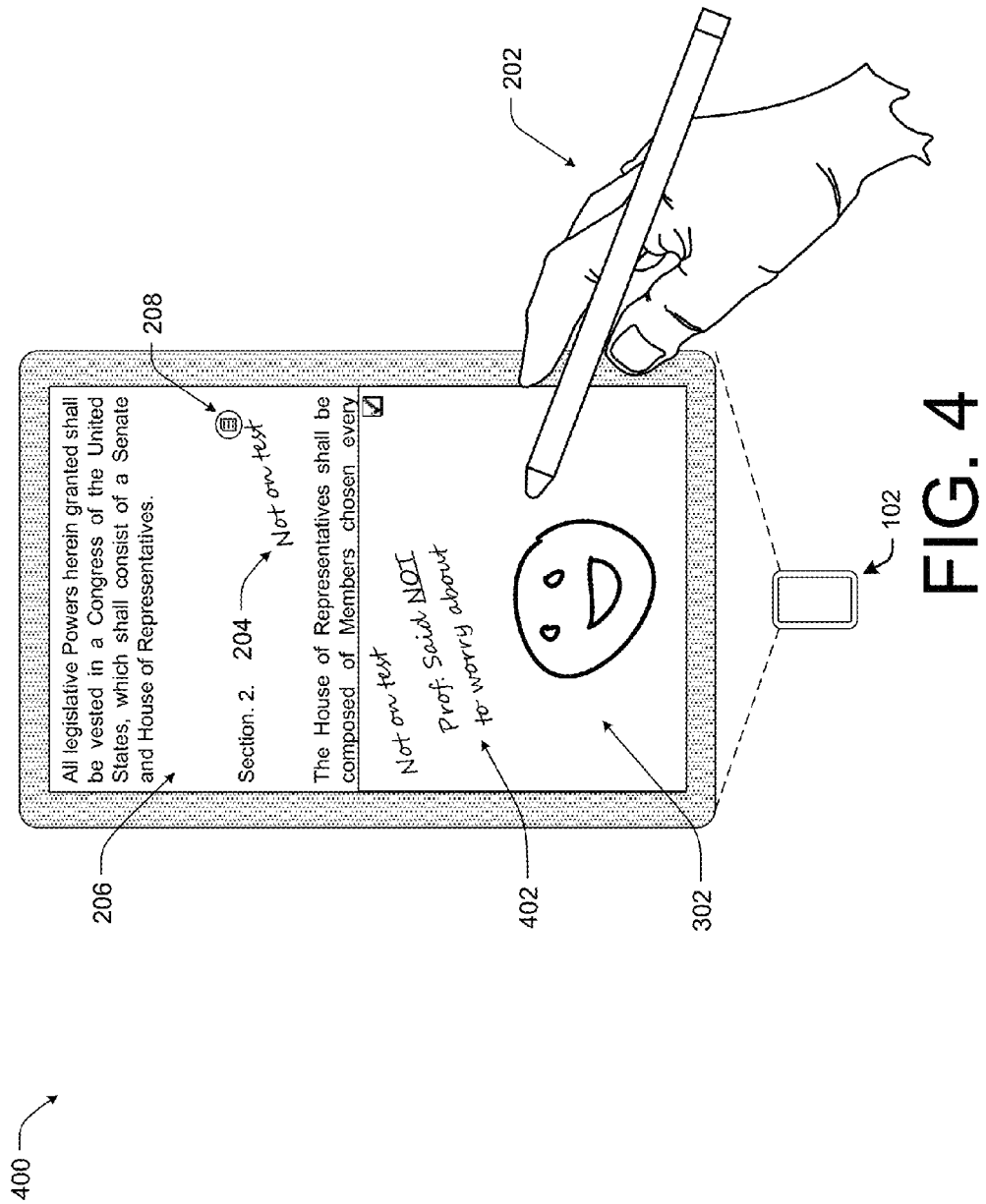
FIG. 4 is an illustrative example depicting the user adding additional notes to the annotation using the annotation window.

FIG. 4 is an illustrative example 400 depicting the user 202 adding additional notes 402 to the annotation 204 using the annotation window 302. For example, the user 202 has added additional text "Prof Said NOT to worry about" to the annotation 204 by writing into the annotation window 302 below the text "not on test." In the illustrated example, the user 202 has also emphasized the word "NOT" by including a hand-drawn underline and a pictographic image by drawing a smiley face, for instance, to indicate that the user 202 is happy about the fact that the "Section 2" is not on the test. Thus, as shown, the user 202 may enter additional text as well as free form drawings to the annotation 204 using the annotation window 302.

Figure 5:
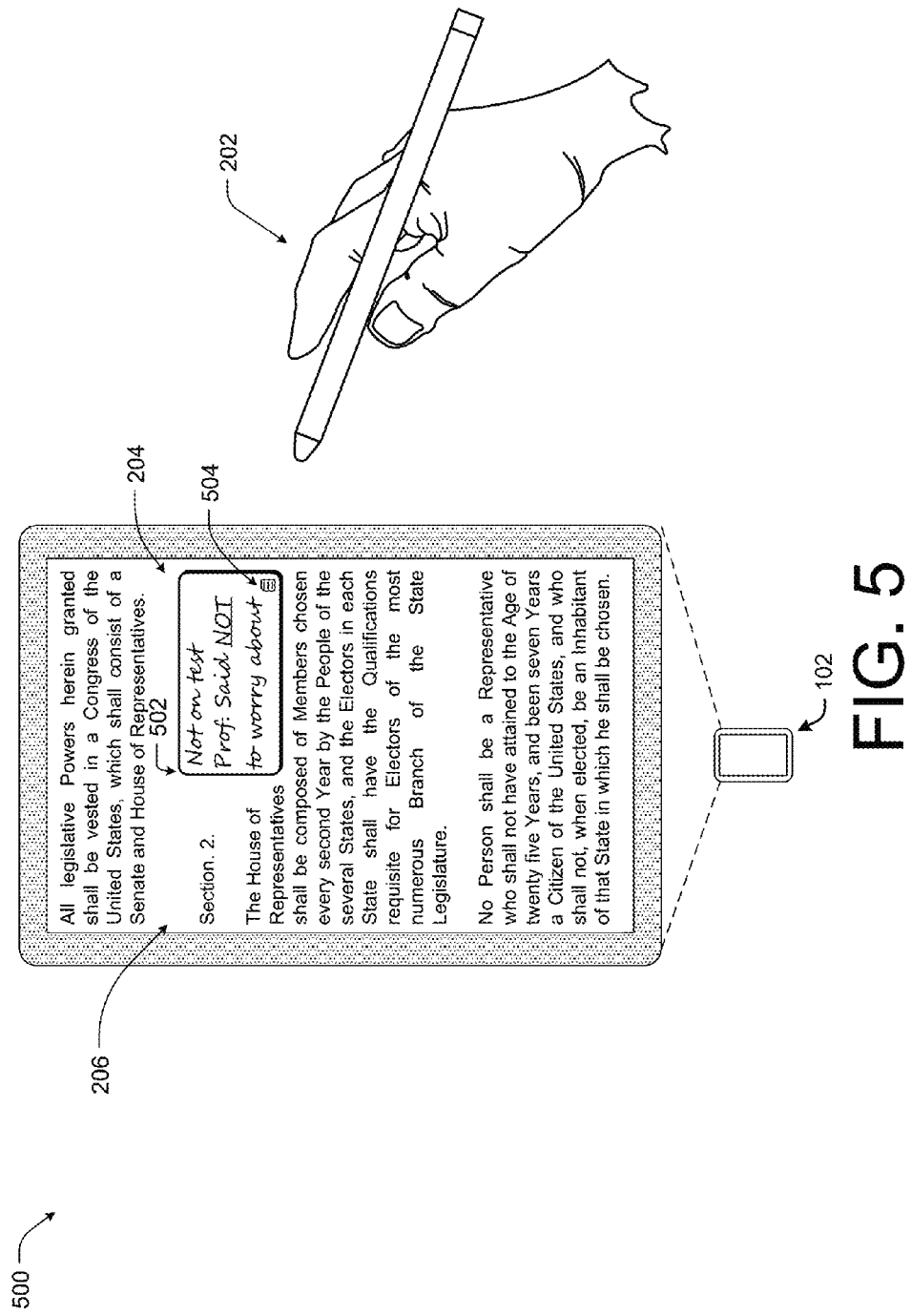
FIG. 5 is an illustrative example depicting the displayed content having been updated in response to the user closing the annotation window.

FIG. 5 is an illustrative example 500 depicting the displayed content 502 having been updated in response to the user 202 closing the annotation window 302. For instance, in the illustrated example, the annotation 204 including the original text "not on test" and the additional text "Prof. Said NOT to worry about" has been inserted at the location that the user 202 originally began to insert the annotation 204. Additionally, the content of the content item 206 presented on the display of the electronic device 102 has been reflowed to allow the annotation 204 to be viewed in-line with the content.

For example, a touch sensor and/or other input controller of the device 102 may associate the annotation 204 with an x/y coordinate of the display of the device 102 based at least in part on the location of the icon 208 and/or on the a first stroke of the text of the annotation 204. The device 102 may compare and/or map the x/y coordinate received from the touch sensor with coordinates associated with the content currently 206 rendered on the display of the device 102. In some cases, by comparing the x/y coordinate of the annotation 204 with the locations and coordinates of the content 206 as currently rendered on the display, the device 102 may be able to determine an association between the content 206 rendered on the display and the location of the annotation 204 and, thereby an intent of the user to associate the annotation 204 with particular portions of the content 206 (e.g., a section of text, caption, white space, etc.) or directly with the particular content 206 rendered on the display (e.g., a word, letter, title, image, etc.).

For instance, in some implementations, the location that the annotation 204 is inserted or anchored to may be a location other than the location that the user 202 inserted the annotation 204. For instance, in one implementation, the device 102 may draw a bounding box around the text of the annotation 204, select a corner of the bounding box (for instance, the corner farthest from the edge of the display), identify an x/y coordinate associated with the selected corner, identify content 206 (e.g., text or image) closest to the coordinate of the selected corner, and associate or anchor the annotation 204 to the identified content. In this implementation, once the content 206 is reflowed, the annotation 204 is placed in-line with the content 206 and adjacent to the identified content.

In the illustrated example, the device 102 may have selected the upper left corner, generally indicated by 502, of the annotation 204 and associated the annotation 204 with the word "Representatives" as the nearest word or portion of the content item 206. In this manner, if the user 202 placed the device 102 in a horizontal orientation or to view the content on another device having a different size display, the annotation 204 would still appear in line with the content and adjacent to the text "Representatives," as the annotation 204 is associated with the word "Studies." Thus, regardless of the orientation or size of the display and/or the placement or the content of the annotation 204, the annotation 204 is displayed together with the associated content, such that the text of the annotation 204 "not on test" continues to apply to the correct content, i.e., in this example the text "Section 2," as intended by the user 202.

In some cases, the annotation 204 may be too long or too large to display in line with the content and adjacent to the associated content. For instance, in the illustrated example, the smiley face added using the annotation window 302 in FIG. 4 is not shown. Instead, the annotation 204 includes an annotation icon 504. When the annotation 204 is too long or too large to be displayed in the entirety, the user 202 may select the annotation icon 504 to re-open the annotation window 302, such that the user 202 may view the entire annotation 204. In other examples, the device 102 may resize or reformate the annotation 204 to fit in-line at a location adjacent to the associated content. For instance, the device 102 may convert the annotation to machine drawn text and resize the text to match the size of the text of the content. In other instances, the device 102 may reformate the annotation 204, for example, by shrinking the smiley face to fit next to the text "not on test" within the space allocated to the annotation 204.

Figure 6:
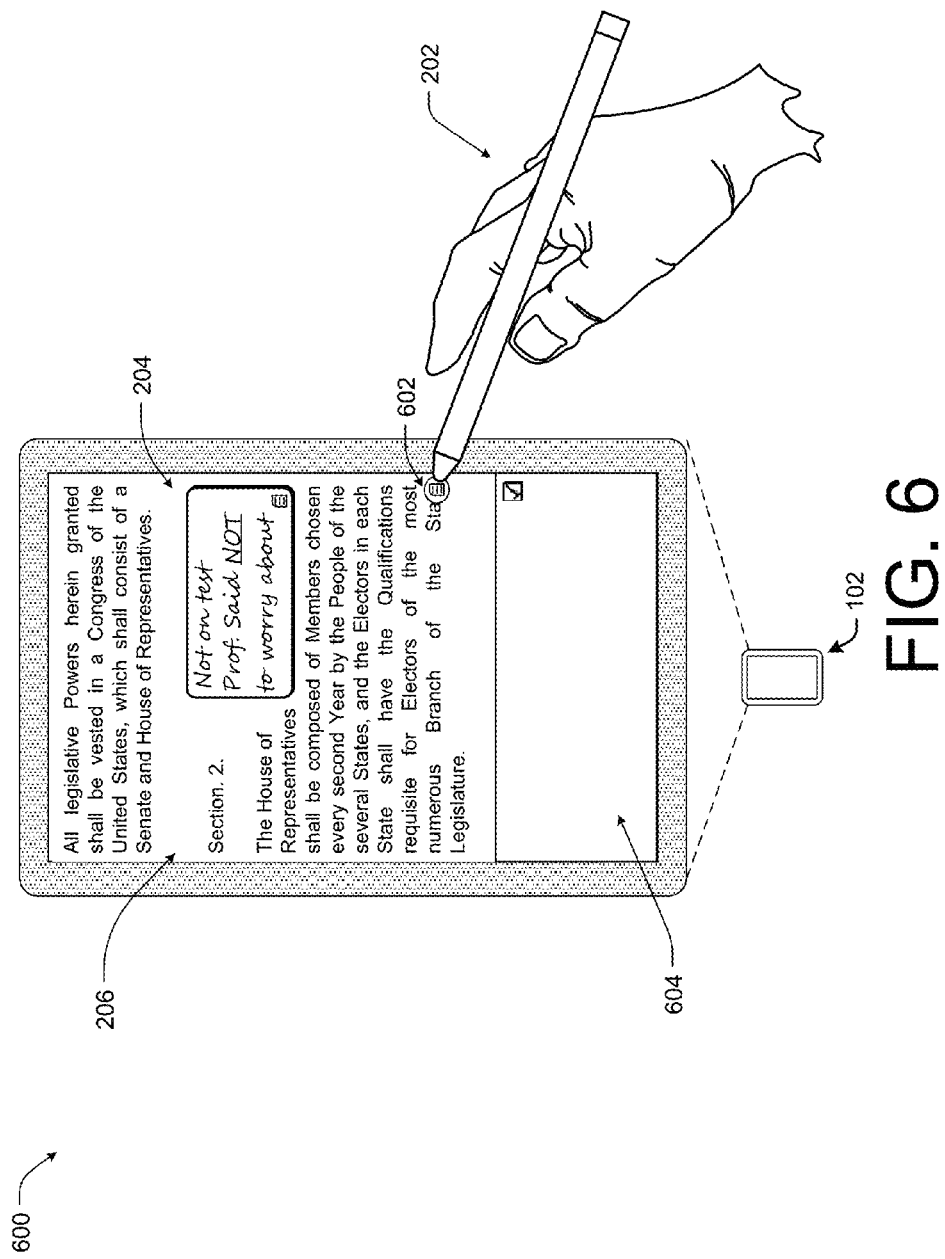
FIG. 6 is an illustrative example depicting the user input inserting a second annotation into the content item.

FIG. 6 is an illustrative example 600 depicting the user 202 input inserting a second annotation into the content item 206. In the illustrated example, the user 202 has been tapping the stylus at a location at which the user 202 desires to insert the second annotation and, in response, the device 102 is displaying an annotation icon 602. In this example, the user 202 has selected the annotation icon 602 and, in response, the device 102 has again opened an annotation window 604. The annotation window 604 is smaller than the annotation window 302 of FIG. 3. In some cases, the size of the annotation window 604 may be based upon the location that the user 202 desires to insert the annotation, the location the annotation icon 602 is displayed, the size of the display associated with the electronic device 102, the orientation of the device 102, the use of stylus, type of display, among others.

Figure 7:
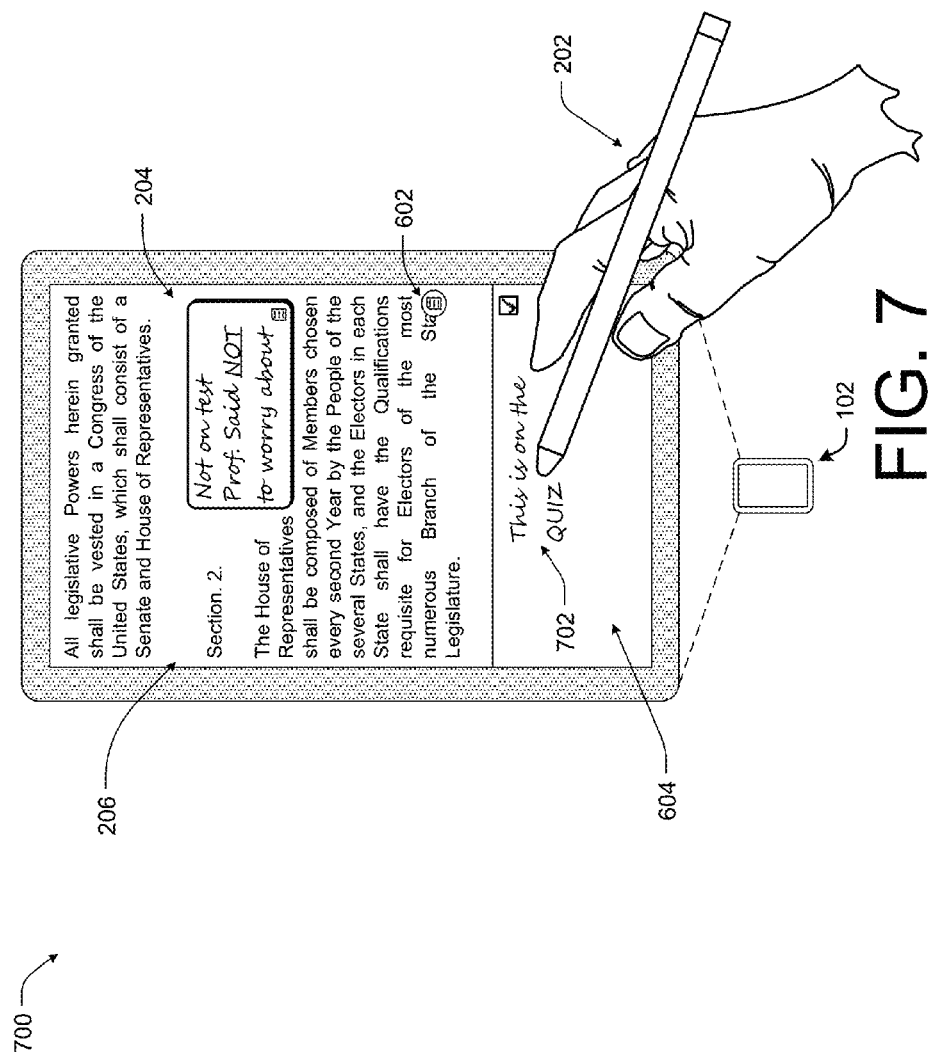
FIG. 7 is an illustrative example depicting the user entering the text of the second annotation.

FIG. 7 is an illustrative example 700 depicting the user 202 entering the text of the second annotation. In the illustrative example, the user 202 has entered the text 702 by writing within the annotation window 604. In this example, the device 102 continues to display the annotation icon 602, for instance, to indicate to the user 202 the location at which the annotation once complete will be anchored. In other implementations, the device 102 may hid the annotation icon 602 once selected, for instance, to increase the overall size of the space available to the user 202 to write in within the annotation window 604.

Figure 8:
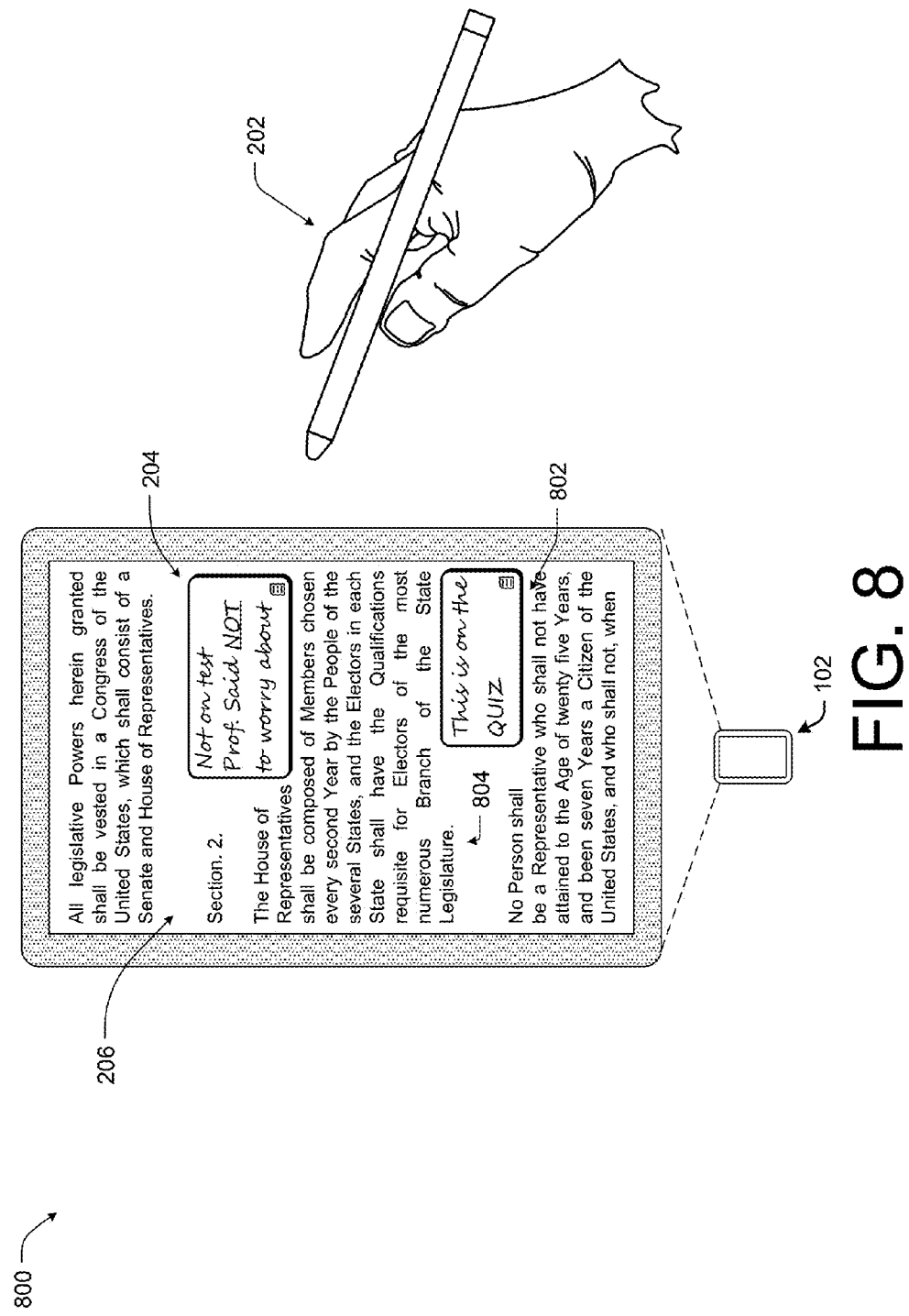
FIG. 8 is an illustrative example depicting the second annotation inserted in-line with the text of the content item.

FIG. 8 is an illustrative example 800 depicting the second annotation 802 inserted in-line with the text of the content item 206. For instance, in the illustrated example, the second annotation 802 has been inserted at the location of the annotation icon 602 or at the location at which the user 202 originally tap the stylus and the content of the content item 206 has been reflowed around the second annotation 802.

As discussed above with respect to the annotation 204 and FIG. 5, in some implementations, the second annotation 802 may be anchored to or associated with a particular word, generally indicated by 804, of the content item 206. For example, the second annotation 802 may be anchored to the word 804 that the annotation icon 602 was rendered over, in this case the word "Legislature." In other examples, the device 102 may insert the second annotation 802 at the location of the annotation icon 602, draw a bounding box around the second annotation 802, select a corner of the bounding box (for instance, the corner farthest from the edge of the display), identify the word 804 closest to the selected corner, and associate or anchor the annotation 802 to the identified word 804. By anchoring or associating the second annotation 802 with a word 804, the second annotation 802 may remain at a location in-line or adjacent to the text of the content item 206 that provides context to the second annotation 802 regardless of the device 102, size of the display, and/or the orientation of the display upon which the content item 206 is rendered. For instance, in the illustrated example, the second annotation 802 remains adjacent to the content that the user 202 intends to identify as on the quiz.

In the illustrated example, some of the text of the content item 206 is no longer displayed. For instance, when the content is reflowed to insert the second annotation 802, the display may no longer be large enough to render all of the content previously displayed. In this instance, the content that no longer fits on the display may be rendered on the next page, for example, following a page turn.

Figure 9:
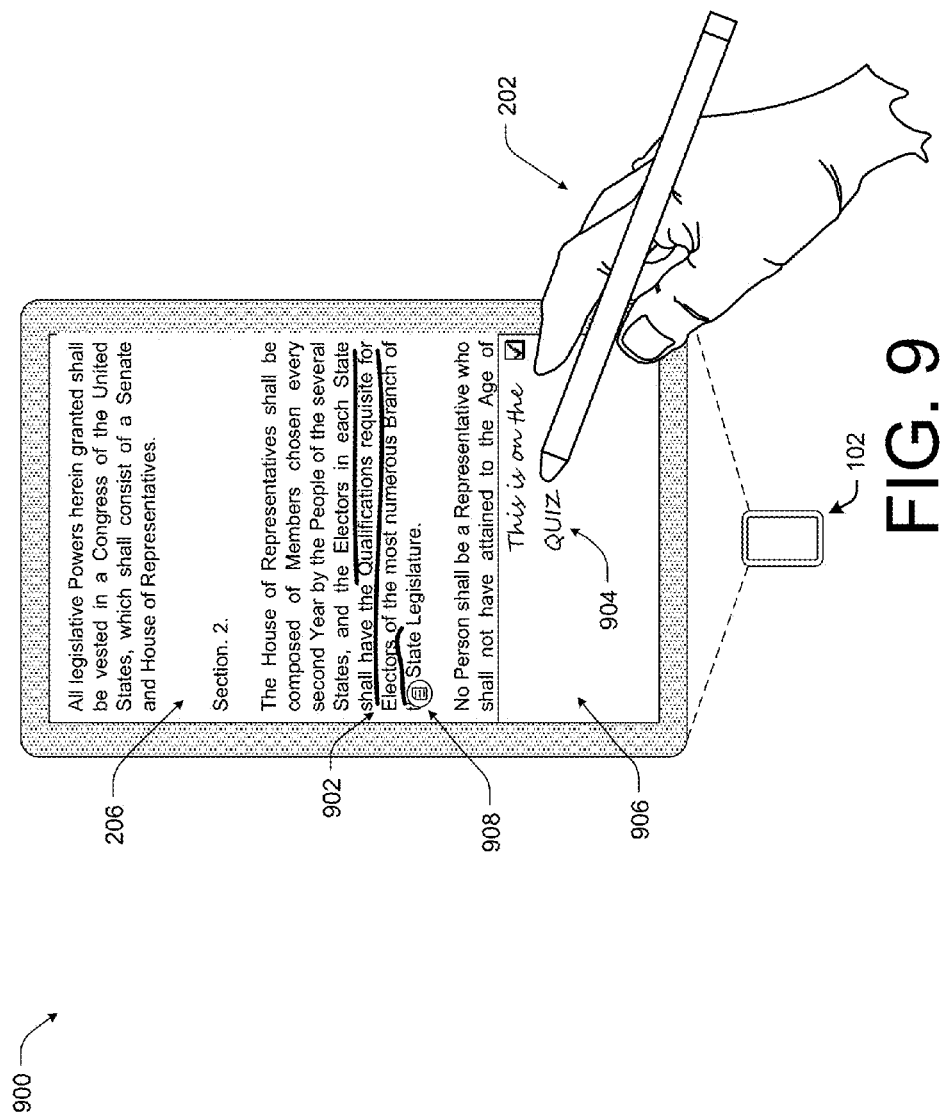
FIG. 9 is an illustrative example depicting the user emphasizing a portion of the content item.

FIG. 9 is an illustrative example 900 depicting the user 202 emphasizing a portion 902 of the content item 206. In the illustrated example, the user 202 has underlined the portion 902 of the content item 206 to emphasize the importance of the text "the Electors in each State shall have the Qualifications requisite for Electors." The user 202 is also writing out an annotation 904 including the text "this is on the quiz" to associate, anchor, or link to the emphasized portion 902 using the annotation window 906.

In some implementations, the annotation window 906 may be opened in response to the user 202 emphasizing (e.g., underlining) the portion 902 of the content item 206. In other implementations, the device 102 may display the annotation icon 908 and the annotation window 906 may be opened in response to the user 202 selecting the annotation icon 908, for instance, in the case that the user 202 wishes to emphasize the portion 906 without adding an associated annotation 904.

Figure 10:
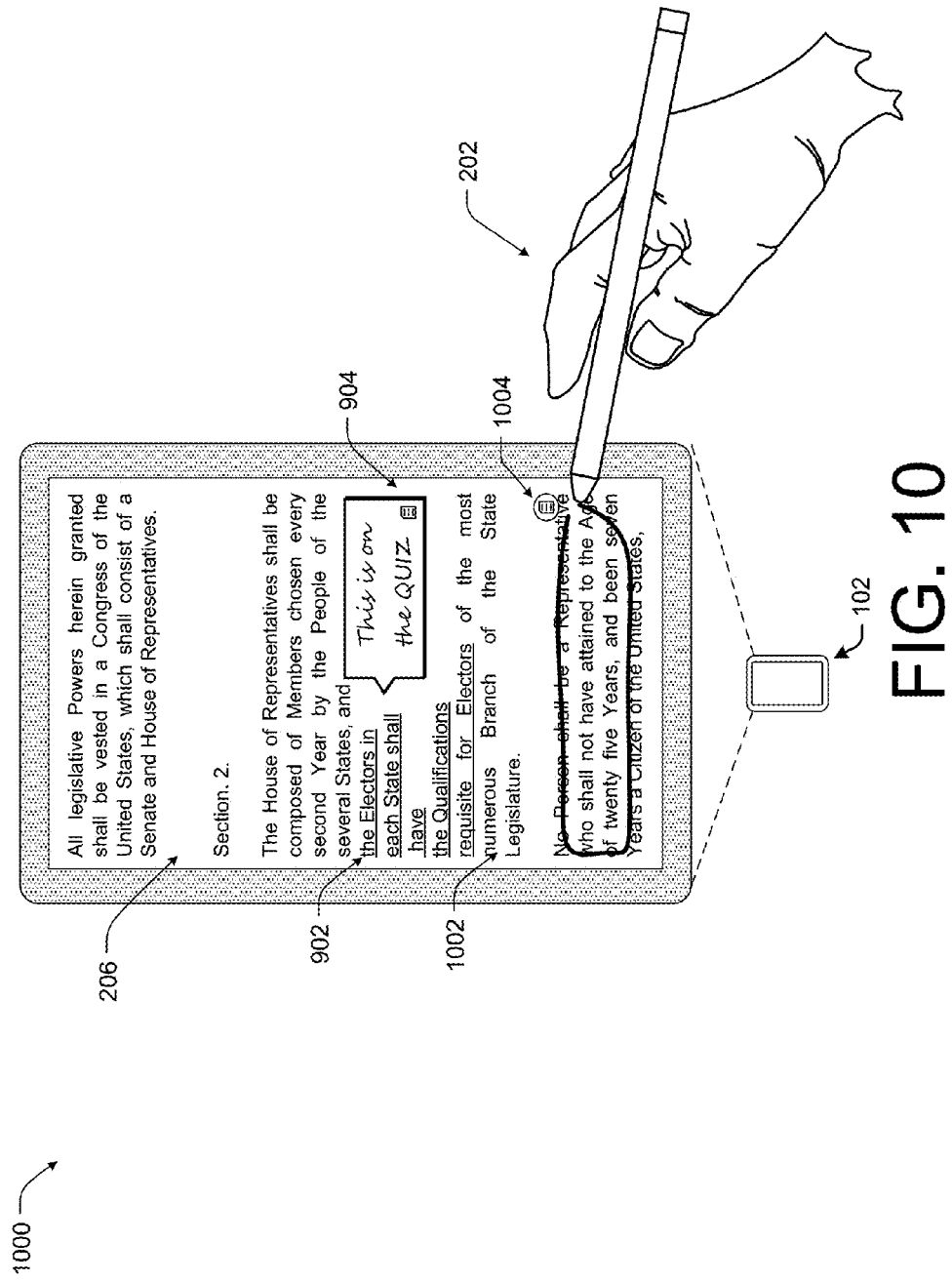
FIG. 10 is an illustrative example depicting the insertion of the annotation associated with the emphasized portion in-line with the text of the content item.

FIG. 10 is an illustrative example 1000 depicting the insertion of the annotation 904 associated with the emphasized portion 902 in-line with the text of the content item 206. In the illustrated example, the user 202 has completed the annotation 904 and caused the device 102 to insert the annotation 904 in-line with the content of the content item 206, for instance, by closing the annotation window 906. In this example, the device 102 has translated the raw user underline of the portion 902 into a processed underline to more clearly indicate to a reader (e.g., a reader other than the user 202) that the portion 902 has been emphasized. For example, the processing of the underline may assist a reader by generating unambiguously emphasis to portions of the content item 206. In other examples, the device 102 may more clearly indicate the emphasis by highlighting the portion 902, changing the font color of the portion 902, bolding the portion 902, adding a background color or image to a layer below the portion 902, rendering a machine generated or processed circle around the portion 902, among other techniques. In general, the processing of the underline may occur after or in response to a removal of the stylus or finger from the proximity of the device 102.

In one particular example, the processed underline may help the user 202 to determine if the correct or entirety of the portion 902 has been selected. If not the user 202 may join, merger, or add additional underlining to more accurately select the portion 902 by connecting underlined portions, for example, using a select and drag approach, by underlining additional content, erasing or removing some the underline from some of the content (for example, by again underling the content using the other end of the stylus), among others. In some cases, the processed underline allows the user 202 to add a second underline to a particular portion of the underlined to more heavily emphasis the particular portion over the portion 902.

In the illustrated example, the device 102 has also inserted the annotation 904 in-line with the content and adjacent to the emphasized portion 902. For instance, by adding the annotation 902 to the content item 206 with regards to the emphasized portion 902, for example, by selecting the annotation icon 908 following completion of the underlining, the device 102 has linked or anchored the annotation 904 to the portion 902 of the content item 206. In addition to locating the annotation 904 adjacent to the portion 902, the annotation 904 includes an arrow providing a visual indication to a reader of the content item 206 that the annotation 904 is associated with the emphasized portion 902.

In some examples, the device 102 may identify the content 206 to link or anchor the annotation 904 to based in part on the an x/y coordinate of the emphasized portion 902 on the display relative to the content 206 currently being rendered. For instance, the device 102 may compare the x/y coordinates of the raw underline as received from a touch sensor with coordinates associated with the content 206 currently rendered on the display as received from a display controller. In some cases, by comparing the x/y coordinate of the raw underline with the locations and coordinates of the content 206 currently rendered on the display, the device 102 is able to determine that the raw underline is between lines of text of the content 206, as the content 206 has been rendered on the display. The device 102 may then infer that the user intent was to underline or emphasizes the portion 902 and that the user has an intent of the user to associate the annotation 904 with the underlined text of the content 206.

In the illustrated example, the user 202 has also selected a second portion 1002 to emphasize. In this example, the user 202 has emphasized the portion 1002 by circling the text "No Person shall be a Representative who shall not have attained the Age of twenty five Years, and Been seven Years a Citizen of the United States," rather than by underlining the text. In this example, the device 102 may identify the corners or a location near the corners of the user input or circle and compare receive the x\y coordinates associated with the corncers to the content 206 currently rendered on the display of the device 102 to identify or infer an intent of the user to emphasize the portion 1002. For example, the device 102 may interpret the relative nearness of the x\y coordinates to the edge of the display and the edge of the text of the content item 206 as an intent to circle the emphasized portion 1002.

Similar to the underling of the portion 902, the device 102 displays an annotation icon 1004 to allow the user 202 to add and associated an annotation with the second portion 1002. However, as will be described in more detail below, rather than adding a new annotation to associate with the emphasized portion 1002, the user 202 may link the annotation 904 to the portion 1002.

Figure 11:
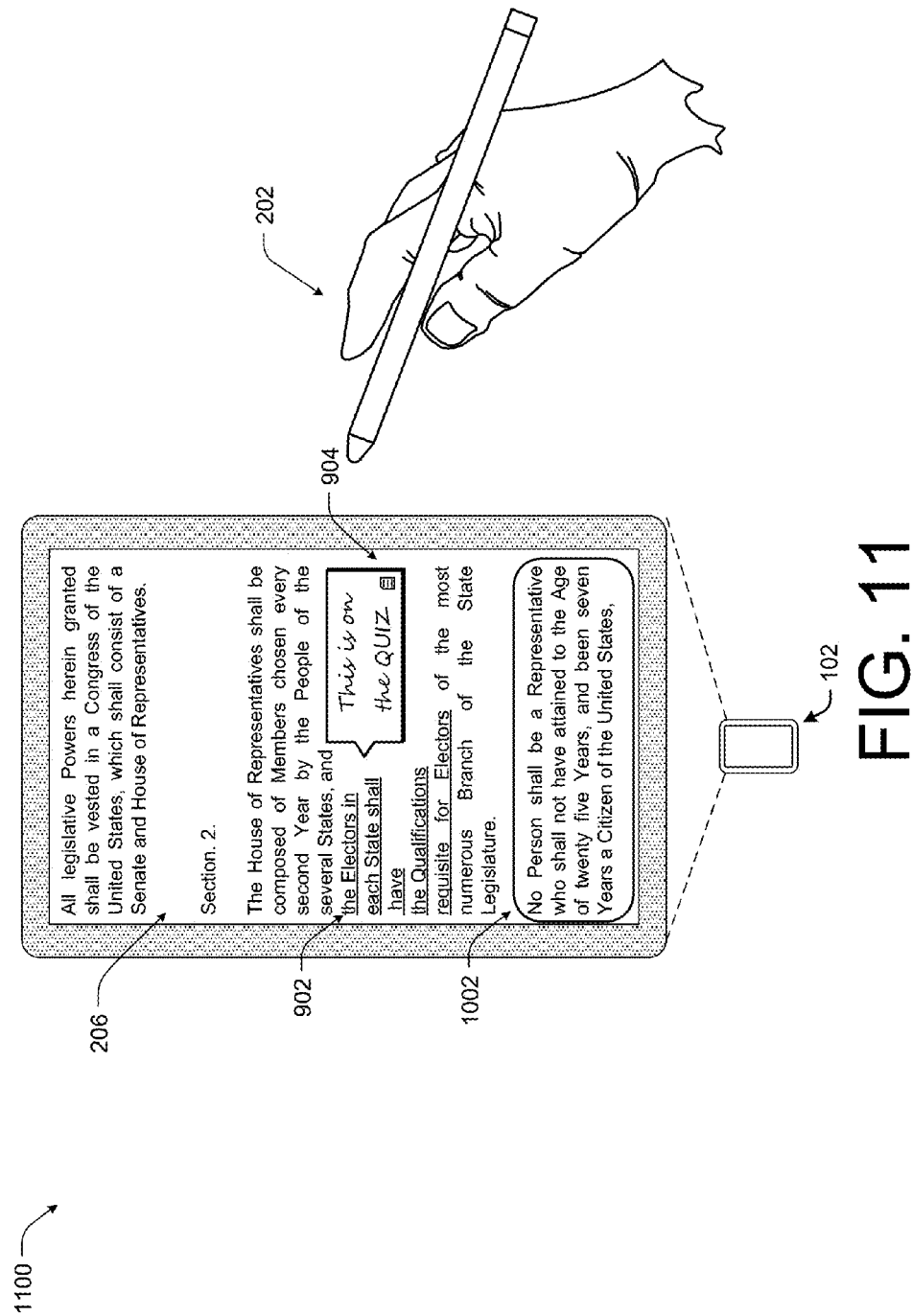
FIG. 11 is an illustrative example depicting the emphasis of portion 1002.

FIG. 11 is an illustrative example 1100 depicting the emphasis of portion 1002. In the illustrated example, the user 202 has removed the stylus from the display of the device 102 after circling the portion 1002, as shown with respect to FIG. 10. In this example, the device 102 has rendered a processed or machine generated circle around the text "the electors in each State shall have the Qualifications requisite for Electors" to reflect the intent of the user 202 provide emphasis to the portion via a circle rather than an underline. In this manner, the device 102 is able to match the intent of the user 202 when emphasizing portions of the content item 206 and to provide the user 202 with multiple types of emphasis that can be easily distinguished.

Figure 12:
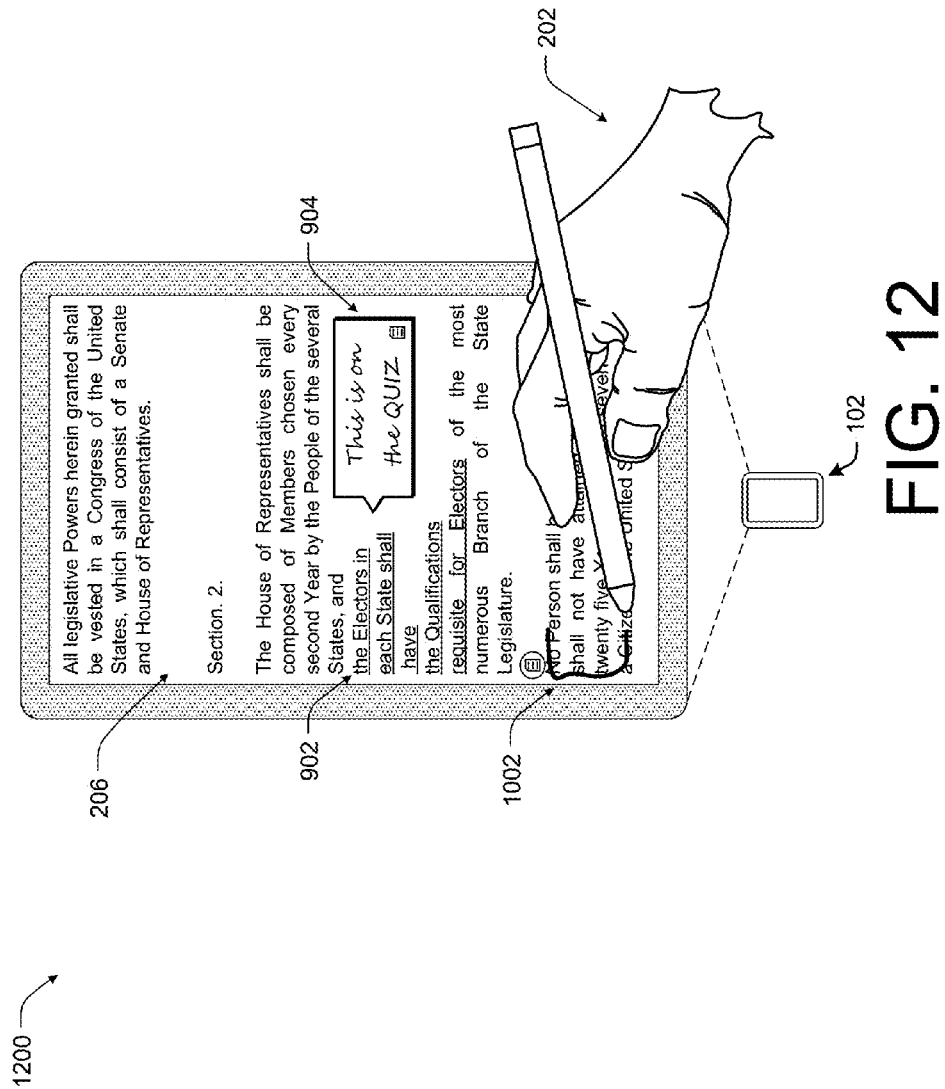
FIG. 12 is another illustrative example of a user emphasizing the second portion of the content item.

FIG. 12 is another illustrative example 1200 of the user 202 emphasizing the second portion 1002 of the content item 206. In this example, the user 202 has selected the second portion 1002 to emphasize by dawning a bracket around the second portion 1002. For instance, the device 102 may identify the coordinates associated with the start and end point of the user input of the bracket, as well as the two corners of the bracket. The device 102 may then compare the coordinates of the start, end, and corners of the user input to the content item 206 as rendered on the display and determine based on a relative location of the text of the content item 206 "No person shall be a Representative who shall not have attained to the Age of Twenty five Years, and been seven Years a Citizen of the United States," (e.g., a nearness of the start to the top line of the text, a nearness of the corners to the edge of the display and the top and bottom lines of the text, and a nearness of the end point of the bracket to the bottom line of the text).

In other examples, the user 202 may also select the portion 1002 for emphasis by drawing a star over the portion 1002, highlighting the portion 1002, underling the portion 1002, circling the portion 1002, selecting a start location and an end location for the portion 1002, among other known selection techniques.

Figure 13:
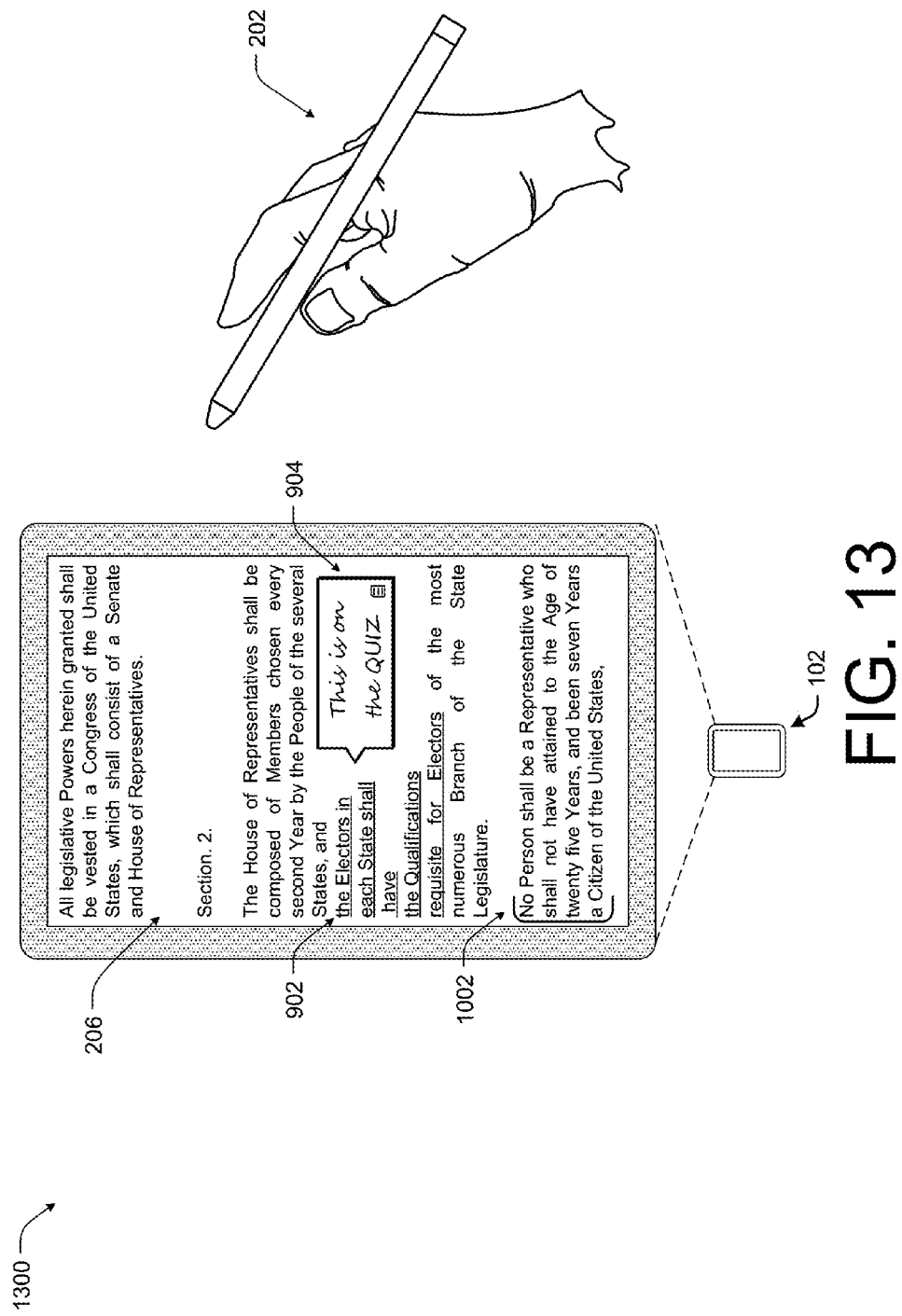
FIG. 13 is an illustrative example 1300 depicting the emphasis of portion 1002.

FIG. 13 is an illustrative example 1300 depicting the emphasis of portion 1002. In the illustrated example, the user 202 has removed the stylus from the display of the device 102 after bracketing the portion 1002, as shown with respect to FIG. 12. In this example, the device 102 has rendered a processed or machine generated bracket around the text "No Person shall be a Representative who shall not have attained to the Age of Twenty five Years," to reflect the intent of the user 202 provide emphasis to the portion via a bracket rather than an underline or circle. In this manner, the device 102 is able to match the intent of the user 202 when emphasizing portions of the content item 206 and to provide the user 202 with multiple types of emphasis that can be easily distinguished.

Figure 14:
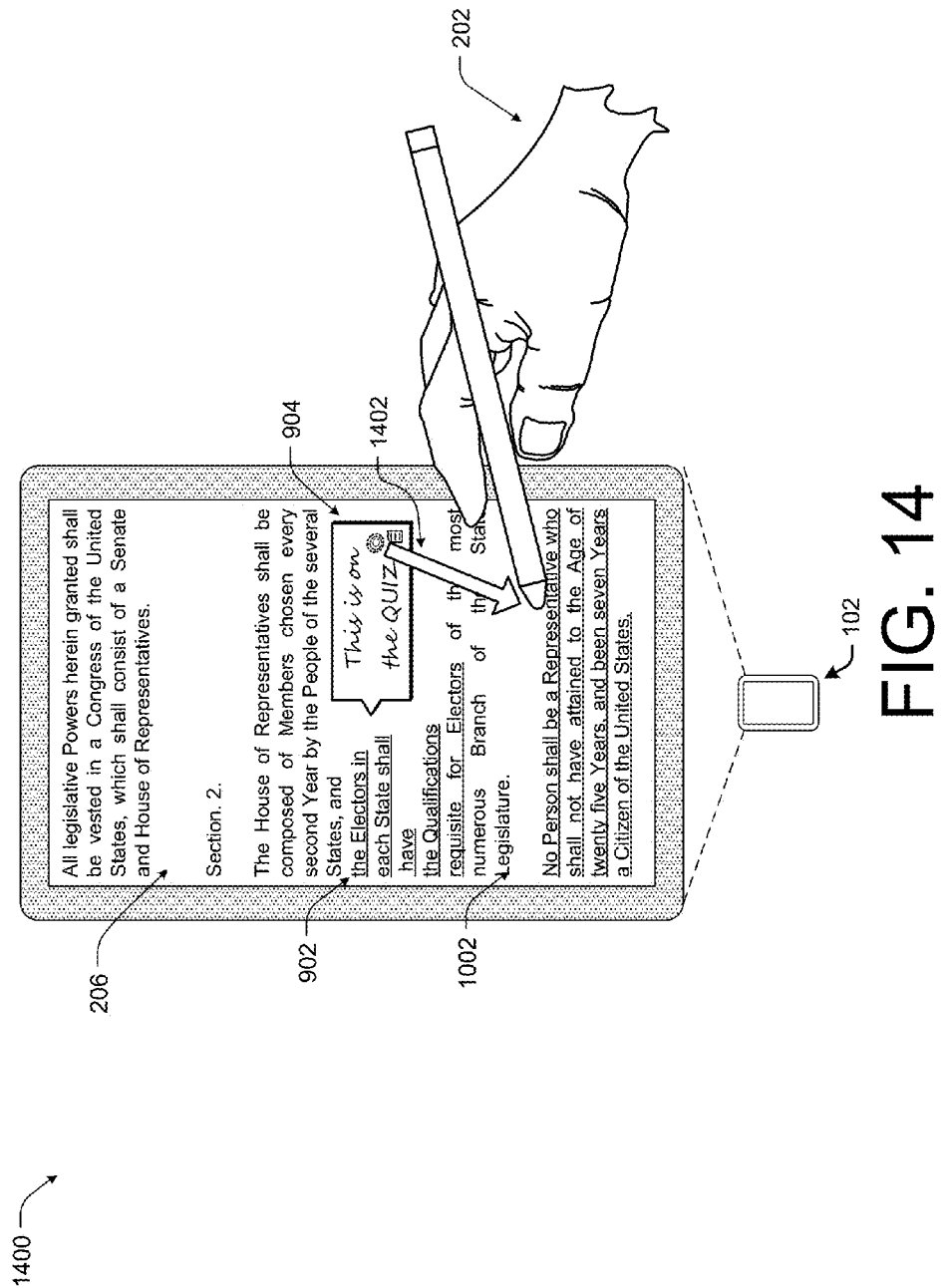
FIG. 14 is an illustrative example depicting the user associating or linking the annotation with the second emphasized portion of the content item.

FIG. 14 is an illustrative example 1400 depicting the user 202 associating or linking the annotation 904 with the second emphasized portion 1002 of the content item 206. In the illustrated example, the device 102 has rendered a processed underline under the emphasized portion 1002, as described above with respect to FIG. 10. In other examples, the device 102 may more clearly indicate the emphasis by highlighting the portion 1002, changing the font color of the portion 1002, bolding the portion 1002, adding a background color or image to a layer below the portion 1002, rendering a machine generated circle around the portion 1002, among other techniques. In some particular implementations, the device 102 may emphasize the portions 902 and 1002 in different manners depending on the user input (e.g., underlining, circling, or bracketing) used to select the respective portions 902 and 1002. For instance, the device 102 may underline portion 902 in response to the user 202 underlining the text "the Electros in each State shall have the qualifications requisite for Electors," and highlight the portion 1002 in response to the user 202 circling or bracketing the text "No Person shall be a Representative who shall not have attained to the Age of Twenty five Years."

In the current example, the user 202 is linking or associating the annotation 904 with the portion 1002 by selecting the annotation 904 and the portion 1002. For instance, in the illustrated example, the user 202 has clicked or tapped on the annotation 904 and dragged the stylus across the display to the emphasized portion 1002, generally indicated by the arrow 1102. As described in more detail below with respect to FIGS. 13 and 14, when the annotation 904 is associated with the portion 1002, the annotation 904 may or may not remain associated with the portion 902.

Figure 15:
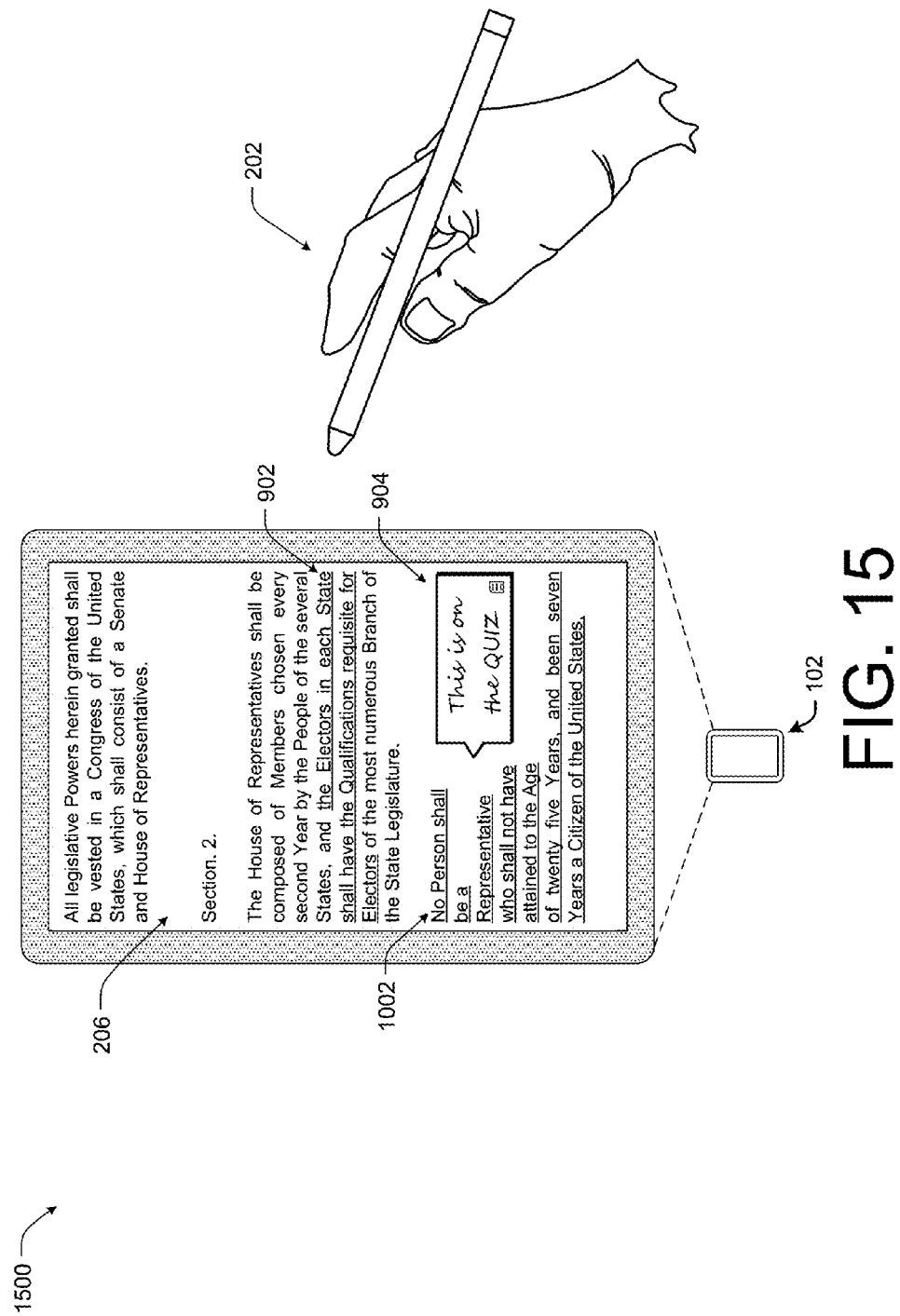
FIG. 15 is an illustrative example depicting the annotation being associated with the second emphasized portion.

FIG. 15 is an illustrative example 1500 depicting the annotation 904 being associated with the second emphasized portion 1002. In the illustrated example, it may be seen that, the annotation 904 is no longer associated with nor located adjacent to the portion 902. Rather, as illustrated, the annotation 902 has been re-located to a position adjacent to the portion 1002 and is now associated therewith. In this example, it should be noted, that the content has again been reflowed around the new location of the annotation 902, such that the annotation 902 appears in-line with the text of the content item 206 and remains adjacent to the portion 1002 regardless of the orientation of the device 102.

Figure 16:
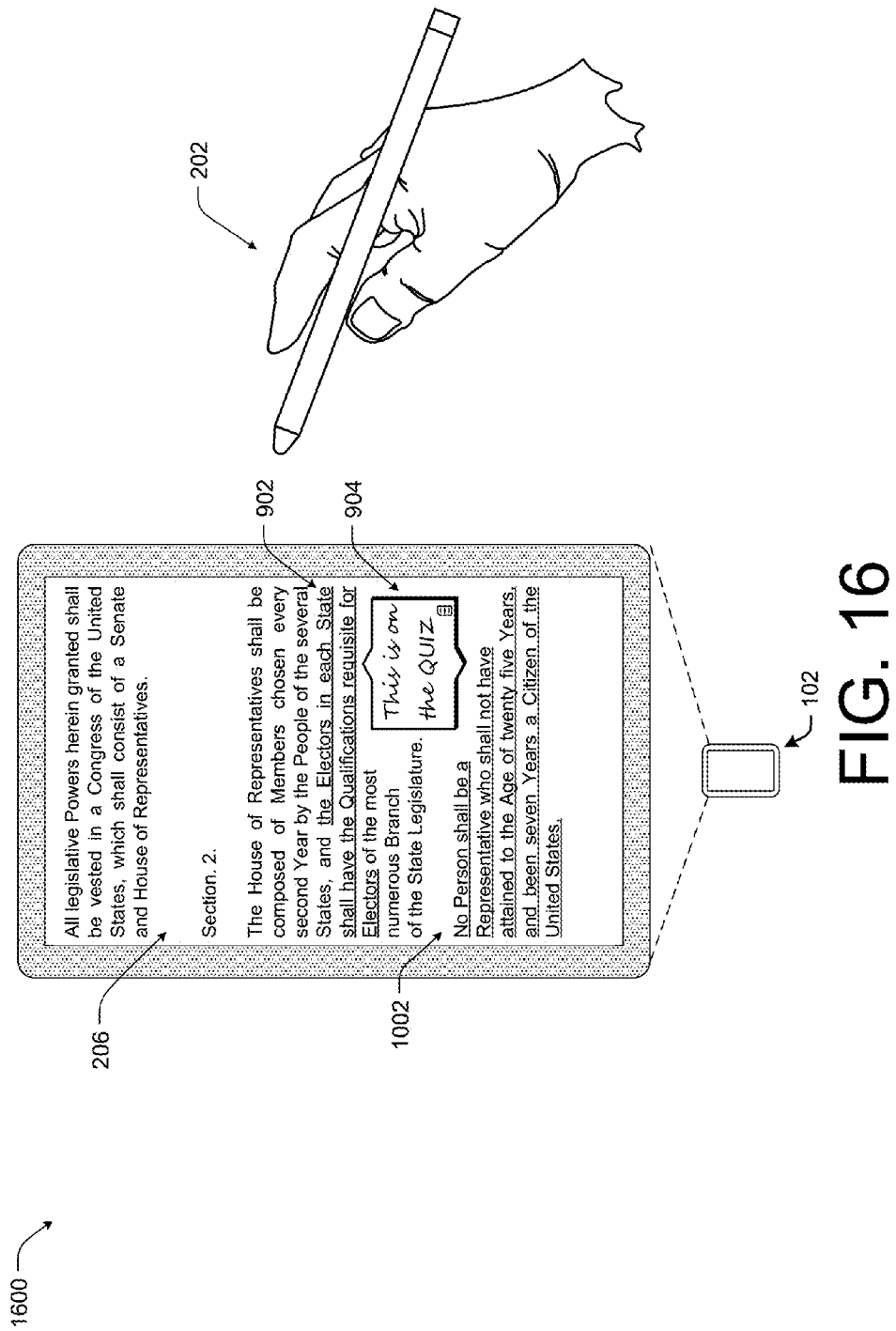
FIG. 16 is another illustrative example depicting the annotation being associated with both the emphasized portion and the second emphasized portion.

FIG. 16 is another illustrative example 1600 depicting the annotation 904 being associated with both the emphasized portion 902 and the second emphasized portion 1002. In this example, by linking or associating the annotation 904 with the second portion 1002, the user 202 has caused the device 102 to associate the annotation 904 with both the portion 902 and the portion 1002. Thus, as illustrated, the annotation 904 is located adjacent to both the portions 902 and 1002 and includes arrows pointing to both the portions 902 and 1002. In other examples, the annotation 904 may be duplicated and displayed adjacent to both the portions 902 and 1002, for instance, when the portions 902 and 1002 are not proximal to each other within the content item 206 or when the portions 902 and 1002 are not displayed within the same view (or page).

Figure 17:
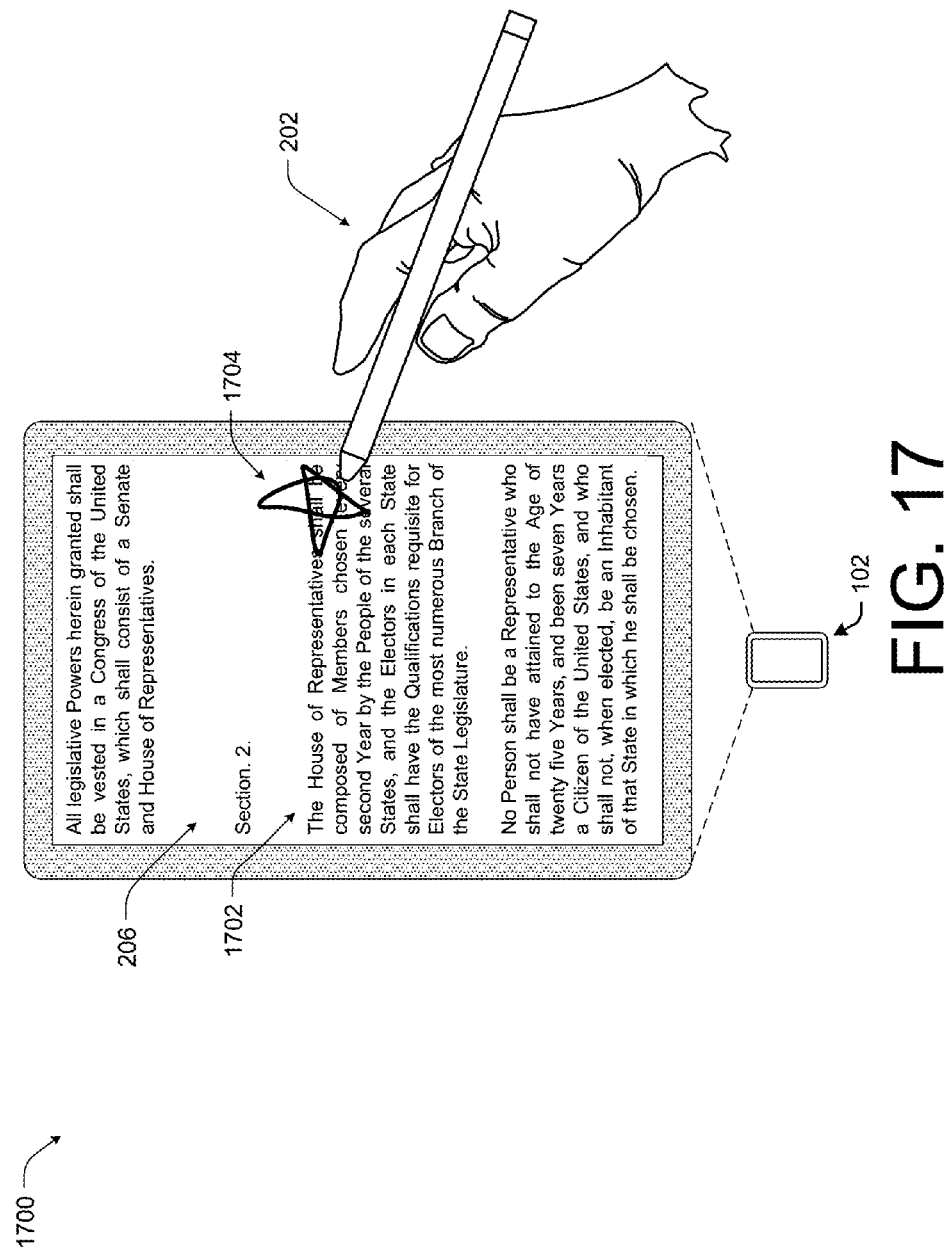
FIG. 17 is an illustrative example depicting the user flagging a portion of the content item.

FIG. 17 is an illustrative example 1700 depicting the user 202 flagging or marking a portion, generally indicated by 1702, of the content item 206. In the illustrated example, the user 202 is flagging the portion 1702 by drawing a mark 1704 (i.e., the star) over the "Section 2" section of the content item 206. In other implementations, the user 202 may flag or mark a section of the content item 206 by drawing other markings over the content, for example, the user 202 may mark the portion 1702 with an explanation mark, asterisk, numeral, or other distinguishing mark. In some instances, the user 202 may flag more than one portion with the same distinguishing mark, for example, to group the portions, as will be discussed in more detail below with respect to FIGS. 18 and 19.

In some examples, the device 102 may infer an intent of the user to associated the mark 1704 with "section. 2." of the content item 206 by comparing an x\y coordinate received from the touch sensor or proximity sensor of the device 102 with the coordinates of the first line in "section. 2." of the content item 206 as rendered by a display controller. For instance, in the illustrated example, the device 102 may identify the coordinates associated with the center point of the mark 1704 and based on a comparison of the coordinates of the center point of the mark 1704 and the content item 206 as rendered on the display, that the mark is near the top of the first paragraph of "section. 2." of the content item 206 as currently rendered.

Figure 18:
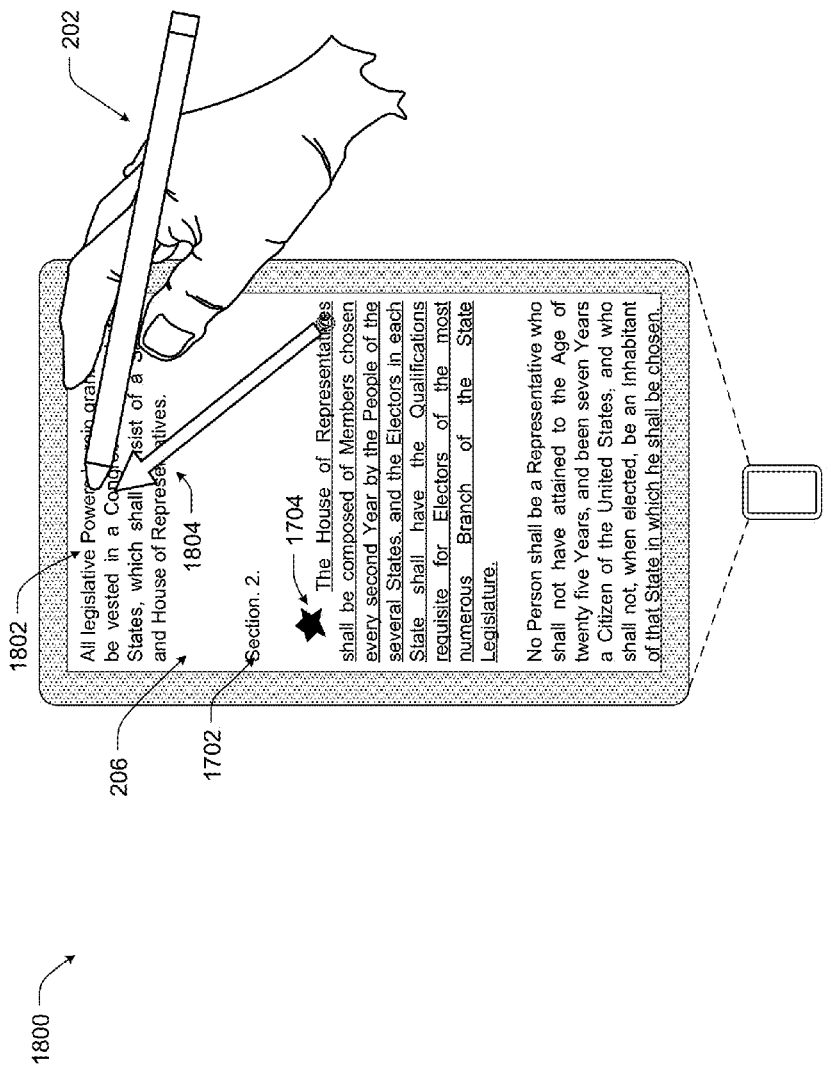
FIG. 18 is an illustrative example depicting the user linking a second portion of the content item to the mark.

FIG. 18 is an illustrative example 1800 depicting the user 202 linking a second portion 1802 of the content item 206 to the mark 1704. In the illustrated example, the device 102 has flagged the portion 1702 with a machine drawn version of the mark 1704 (i.e., the star), as well as emphasized the portion 1702 by underlining the text "The House of Representatives shall be composed of Members chosen every second Year by the People of the several States, and the Electors in each State shall have the Qualifications requisite for Electors of the most numerous Branch of the State Legislature," associated with the flagged portion 1702. In the illustrated example, the device 102 has flagged the portion 1702 with a machine rendering of the mark the user 202 drew over the portion 1702, however, in other examples, the device 102 may mark the portion 1702 using predefined flags, such as consecutive Arabic numerals. In this example, as the user 202 flags different portions of the content item 206, the device may add a new flag having a numerical value one higher than the previous flag, such that the a reader is able to distinguish between the different flagged portions of the content item 206.

Similar, to the annotation of FIGS. 2-16, the mark 1704 is presented in-line with the content of the content item 206. For example, the mark 1704 may be anchored to the first word of the portion 1702, such that the mark 1704 is render adjacent to the first word of the portion 1702 regardless of the type or size of the device 102 or the orientation of the device 102 displaying the content item 206. Again, as in the annotations of FIGS. 2-16, the content of the content displayed may be reflowed around the mark 1704 once the mark 1704 is located with regards to the content of the content item 206.

In the present example, the user 202 is associating the portion 1802 (e.g., the paragraph above the flagged portion 1502), with the mark 1704 by selecting the portion 1702 and dragging the stylus onto the portion 1802 and releasing, as generally indicated by arrow 1804. In one implementation, the user 202 may be flagging both portions 1702 and 1802 with the mark 1704, for example, to designate that both portions 1702 and 1802 are on the upcoming quiz. In other implementations, the user 202 may be moving the flag or mark from portion 1702 to portion 1802, for instance, if the user 202 inadvertently indicated the wrong section of the content item 206.

Figure 19:
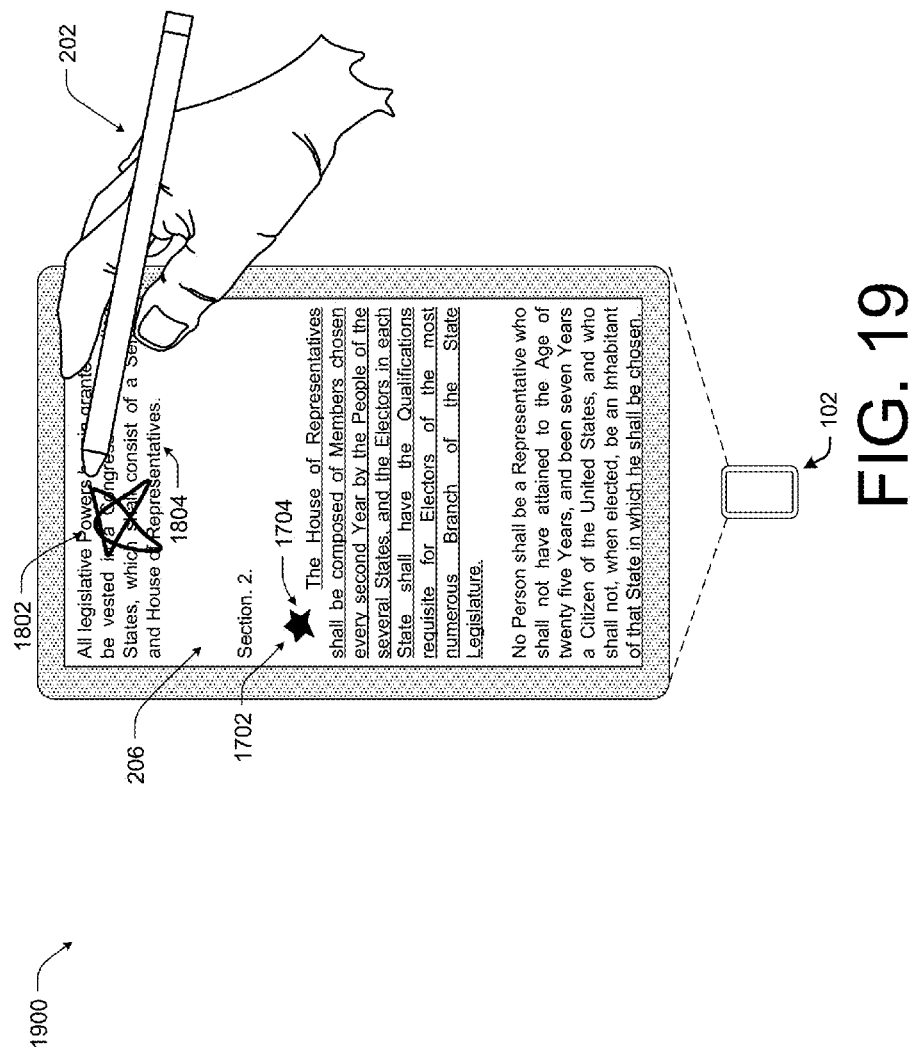
FIG. 19 is an illustrative example depicting the user flagging second portion of the content item with the mark.

FIG. 19 is an illustrative example 1900 depicting the user 202 flagging second portion 1802 of the content item 206 with the mark 1704. In the illustrated example, the device 102 has flagged the portion 1702 with a machine drawn version of the mark 1704 (i.e., the star), as well as emphasized the portion 1702 by underlining the text "The House of Representatives shall be composed of Members chosen every second Year by the People of the several States, and the Electors in each State shall have the Qualifications requisite for Electors of the most numerous Branch of the State Legislature," associated with the flagged portion 1702. In the illustrated example, the device 102 has flagged the portion 1702 with a machine rendering of the mark the user 202 drew over the portion 1702, however, in other examples, the device 102 may mark the portion 1702 using predefined flags, such as consecutive Arabic numerals. In this example, as the user 202 flags different portions of the content item 206, the device may add a new flag having a numerical value one higher than the previous flag, such that the a reader is able to distinguish between the different flagged portions of the content item 206.

Similar, to the annotation of FIGS. 2-16, the mark 1704 is presented in-line with the content of the content item 206. For example, the mark 1704 may be anchored to the first word of the portion 1702, such that the mark 1704 is render adjacent to the first word of the portion 1702 regardless of the type or size of the device 102 or the orientation of the device 102 displaying the content item 206. Again, as in the annotations of FIGS. 2-16, the content of the content displayed may be reflowed around the mark 1704 once the mark 1704 is located with regards to the content of the content item 206.

In the present example, the user 202 is associating the portion 1802 (e.g., the paragraph above the flagged portion 1502), with the mark 1704 by hand drawing a second start over the portion 1802. In one implementation, the user 202 may be flagging both portions 1702 and 1802 with the mark 1704. For example, the user 202 may desire to designate that both portions 1702 and 1802 are on the upcoming quiz.

In some cases, as will be described with respect to FIG. 20 below in more detail, the device 102 may present or display the flagged portions in a special view. For example, the device 102 may provide a list of all content associated with one or more flags and/or the device 102 may generate flashcards from the flagged portions consisting of questions and answers that the user 202 may use to study for the quiz.

Figure 20:
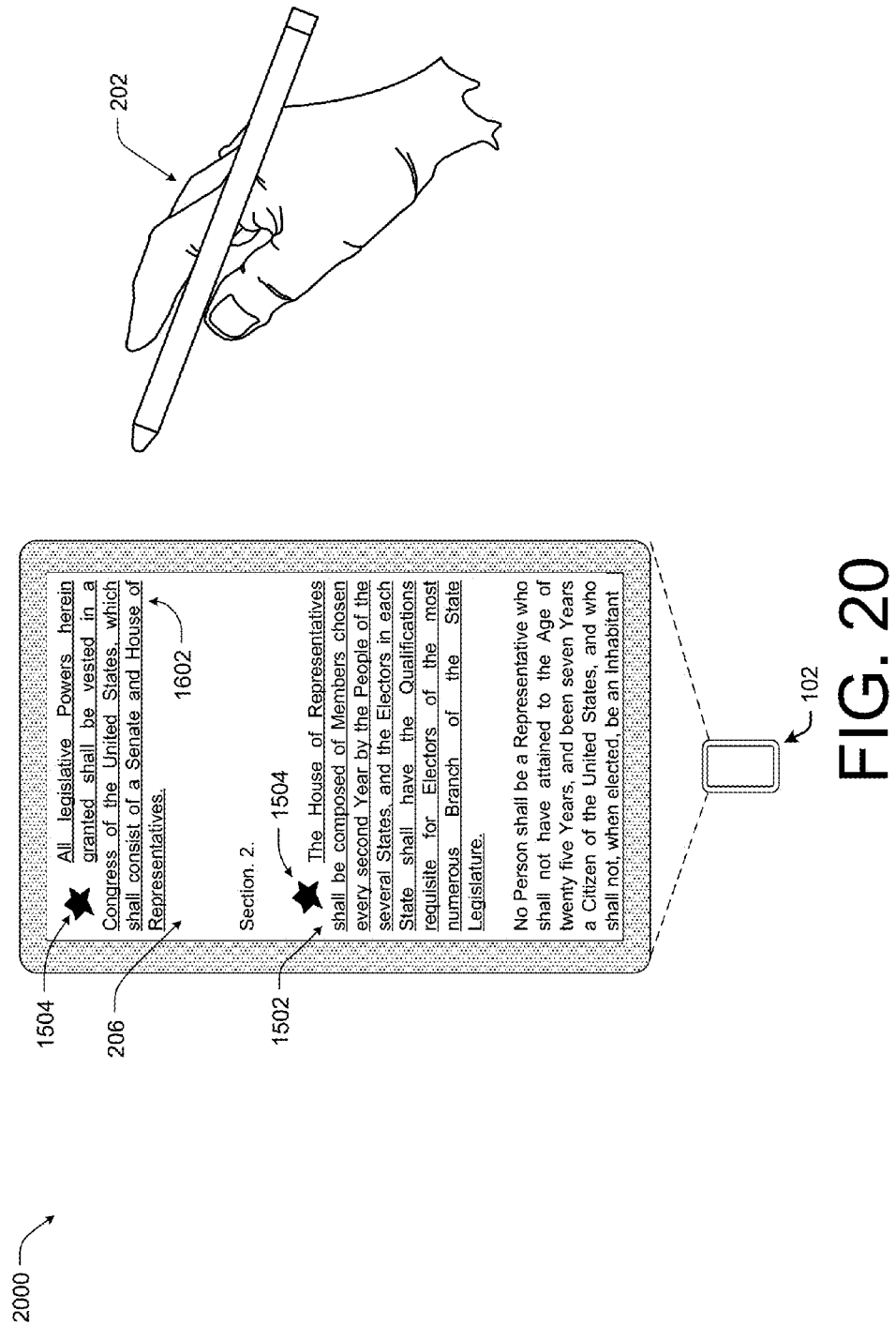
FIG. 20 is an illustrative example depicting the two portions of the content item having been flagged with the same mark.

FIG. 20 is an illustrative example 2000 depicting the two portions 1702 and 1802 of the content item 206 having been flagged or marked with the same mark 1704. In the illustrated example, the device 102 has emphasized the portion 1802 by underlining the text "All legislative Powers herein granted shall be vested in a Congress of the United States, which shall consist of a Senate and House of Representativesd" with processed underline, as well as by flagging the portion 1802 by locating the mark 1704 (e.g., the star) adjacent to the portion 1802. In the present example, the portions 1702 and 1802 are flagged with individual marks 1704, however, in other examples, the portions 1702 and 1802 may be grouped, as the portions 1702 and 1802 are adjacent to each other, and a single mark 1704 may be anchored to the first word of the combined portion 1702 and 1802.

In the illustrated example, the device 102 has added the emphasis to portion 1802 and reflowed the displayed content in response to the user 202 removing the stylus from the surface of the display. However, in some types of displays, such as reflective displays or e-ink displays, power is only applied to the display when the page is being refreshed. Thus, in some implementations, the device 102 may be configured to wait until the display is refreshed to reflow the content in order to conserve power. In one particular example, the device 102 may be configured to reflow the content until the user 202 initiates a page turn.

Figure 21:
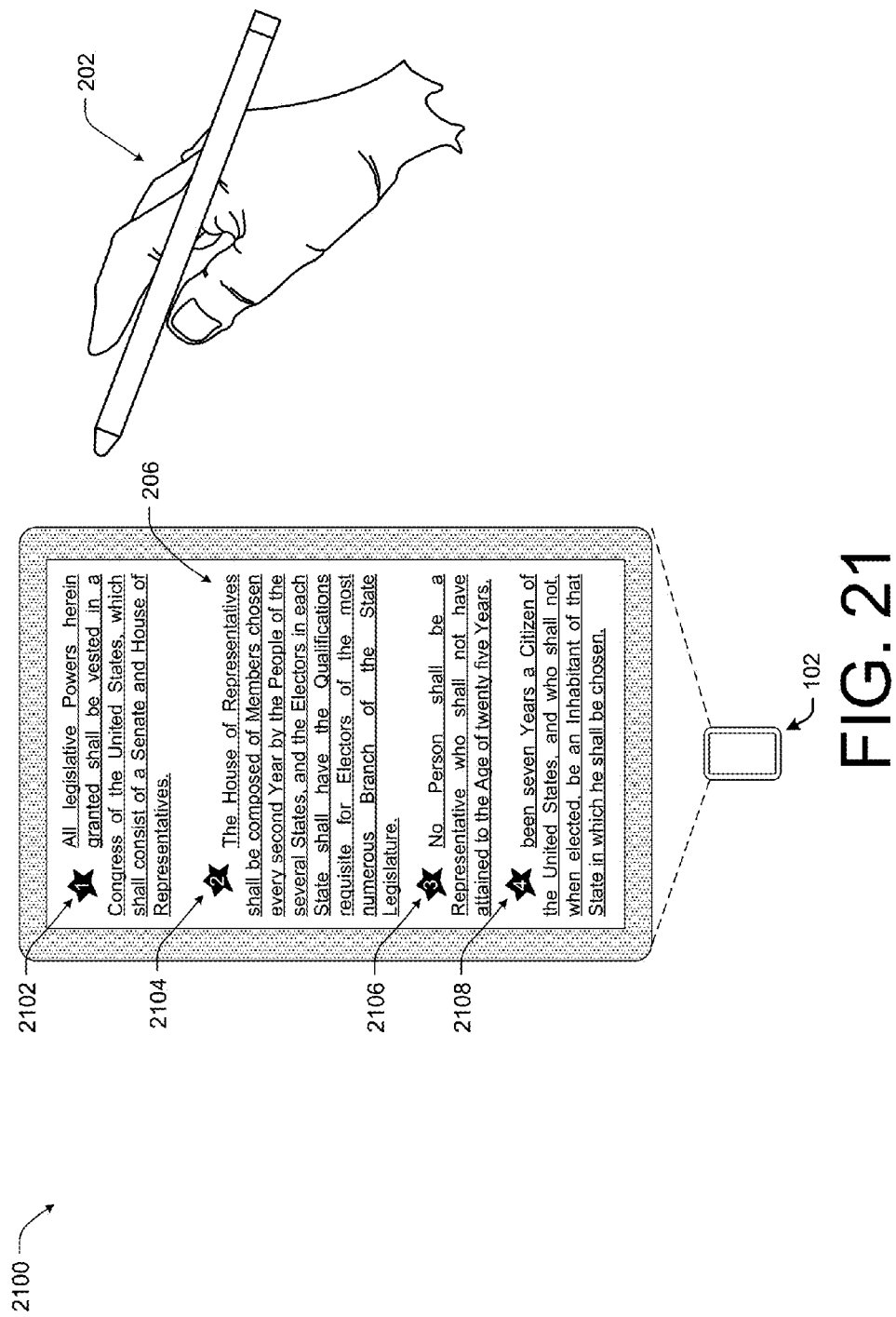
FIG. 21 is an illustrative example depicting a list of flagged portions of the content item.

FIG. 21 is an illustrative example 2100 depicting a list of flagged portions 2102-2108 of the content item 206. In the illustrated example, the user 202 has flagged portions 2102-2108 of the content item 206 by marking the portions 2102-2108 with a star, as described above with respect to FIG. 17. In the illustrated example, each of the portions 2102-2108 include are numbered consecutively from one to four. In some cases, the numeral may relate to each portion 2102-2108 relative position within the content item 206. In other cases, the number may be applied by the user 202, for instance, to indicate a relative importance of each of the portions 2102-2108 that the user 202 marked with a star.

In the present example, the device 102 may present the list of flagged portions 2102-2108 as part of a virtual notebook. For example, the virtual notebook may include portions clipped or extracted from particular content items, such as content item 206, and inserted into the virtual notebook. In the illustrated example, the clip portions include each of the portions flagged or marked by the user with a star. In some cases the clipped portions may include test that has been selected, such as by underlining, images or graphics that have been circled or bracketed, and/or content that has been flagged by the user 202 using one or more particular marks (e.g., the star or exclamation point). In some cases, the virtual notebook or list of flagged items allows the user 202 to quickly view or study the flagged portions 2102-2108 without having to page through the entirety of the content item 206. In other examples, the device 102 may present each of the portions 2102-2108 in separate views (for instance, as flashcards) to enable the user 202 to study each of the portions 2102-2108 individually.

Figure 22:
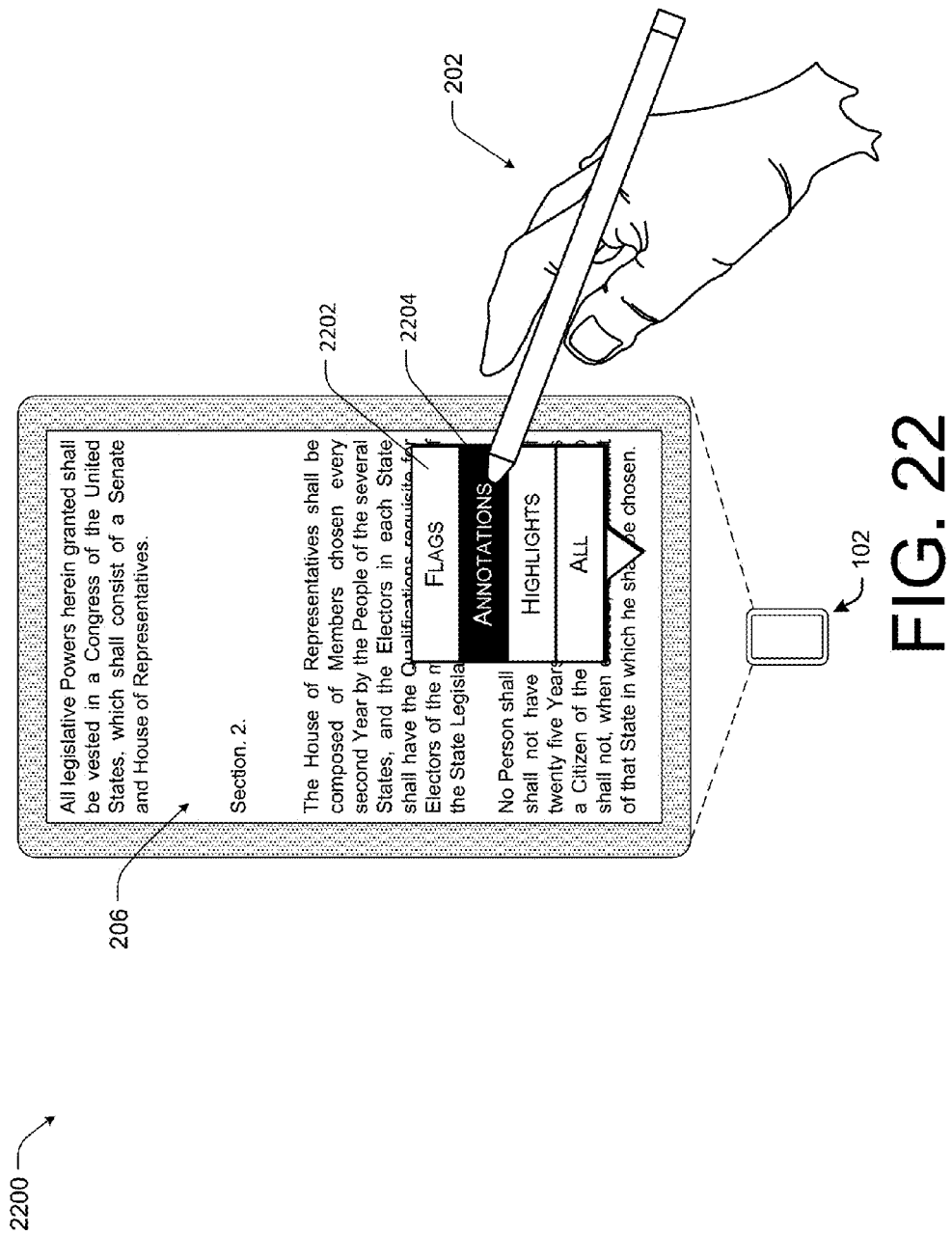
FIG. 22 is an illustrative example depicting the use of a layer menu with respect to the annotations.

FIG. 22 is an illustrative example 2200 depicting the use of a layer menu 2202 with respect to the annotations. In general, the layer menu 1902 includes one or more user selectable options, such as "Flags," "Annotations," and "Highlights," that allow the user to turn off and on various types of annotations when viewing the content item 206. For example, the distinguishing marks described with respect to FIGS. 17-19 may be stored in one layer, the annotations or hand written comments described with respect to FIGS. 2-8 may be stored in a second layer, and the emphases (e.g., the underlining, circling, highlighting, or bracketing) described with respect to FIGS. 9-13 may be stored in a third layer. By selecting the various options provided in the layer menu 2202, the user 202 may turn on and off the various layers allowing the user 202 to either view some or all of the annotations related to the content item 206.

In the illustrated example, all of the layers are currently turned off. However, the user 202 has opened the layer menu 2202 and is turning on the comment layer (e.g., the hand-drawn annotations) by selecting the comments option 2204. By turning on the comments, the annotations stored within the layer will be displayed as described below with respect to FIG. 23.

Figure 23:
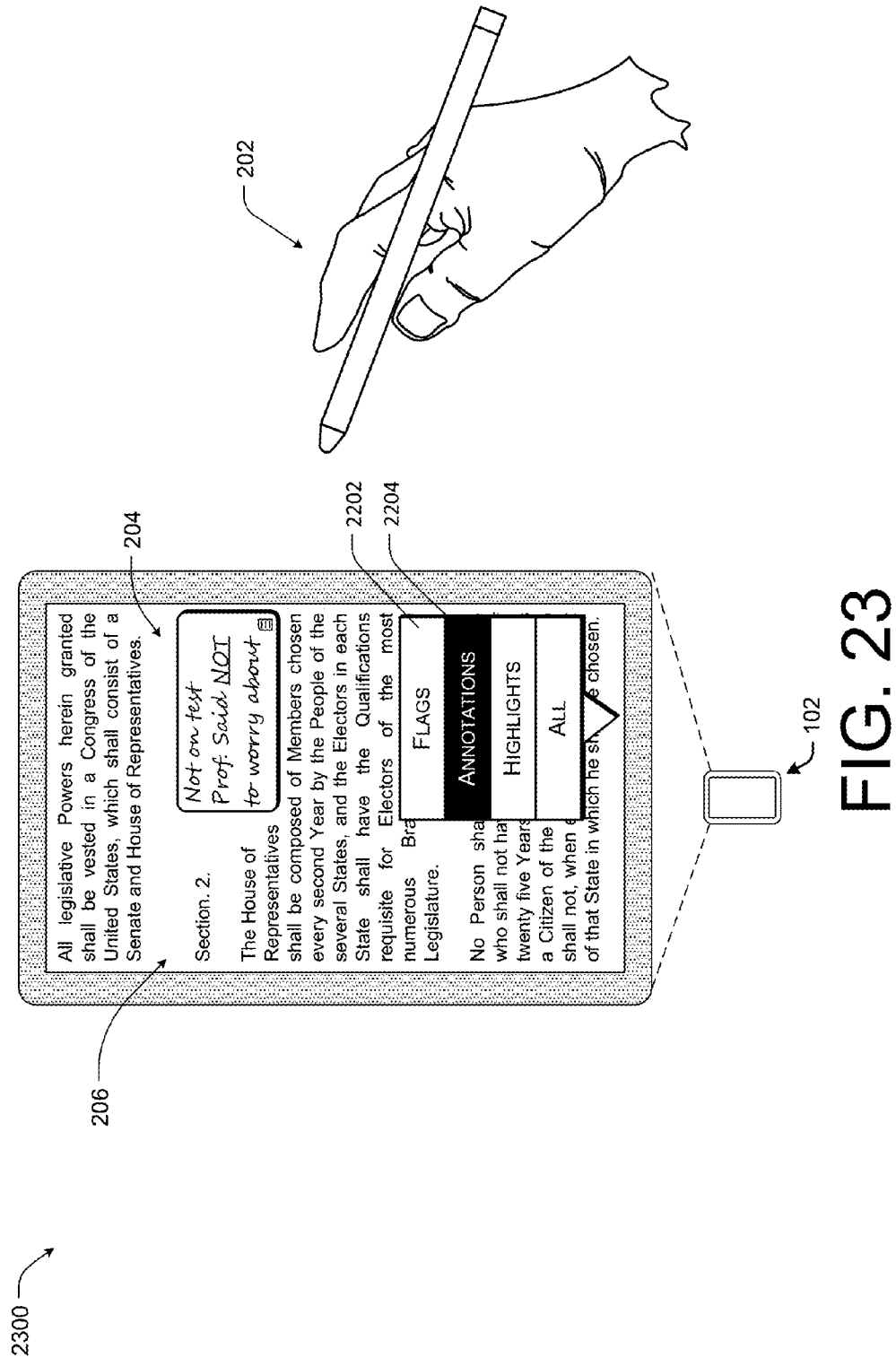
FIG. 23 is an illustrative example depicting the use of layers with respect to the annotations.

FIG. 23 is an illustrative example 2300 depicting the use of layers with respect to the annotations. In this example, the user 202 has turned on the comments layer by selecting the comments option 2204 from the layer menu 2202. In response, the device has displayed the annotation 204, inserted with respect to FIGS. 2-5, and has reflowed the content displayed around the annotation 204, such that the annotation 204 is in-line with the content and adjacent to the header "Section 2" associated or linked with the annotation 204.

FIGS. 24-27 are flow diagrams illustrating example processes inserting in-line annotations as described herein. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 24:
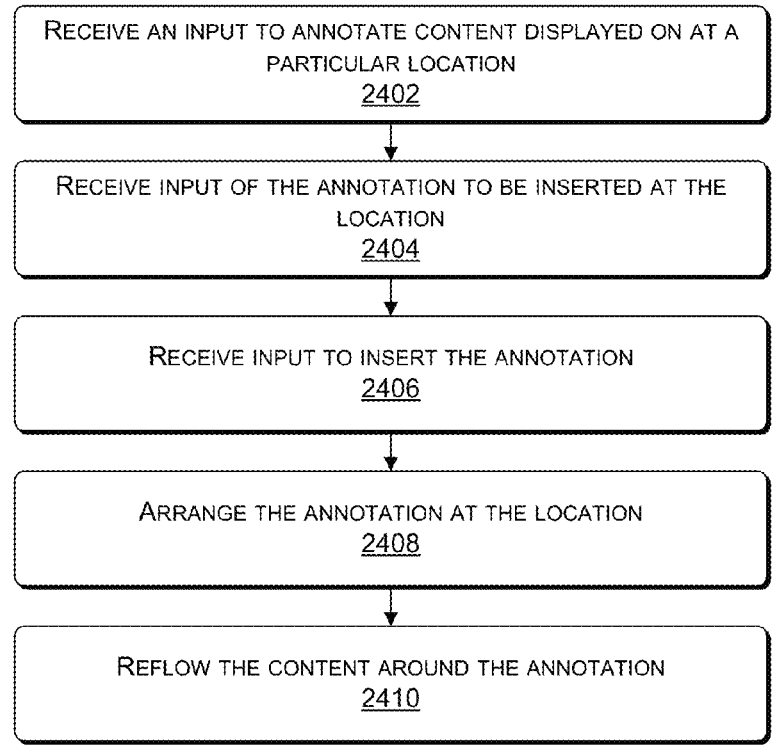
FIG. 24 illustrates an example flow diagram showing an illustrative process for annotating an electronic content item.

FIG. 24 illustrates an example flow diagram 2400 showing an illustrative process for annotating an electronic content item. For example, a user may be inserting comments, notes, or graphics (e.g., stars, exclamations points, happy faces, etc.) related to particular content being displayed by an electronic device. At 2402, the device rendering the content receives an input to annotate the content displayed at a particular location. For example, the user may have selected an annotation icon in response to adding emphasis to the content or tapping a stylus on the display and instated an annotation using the annotation window. In other examples, the user may have written or drawn the annotation directly over the displayed content. In both examples, the user selects a location or portion of the content to associate with annotation.

At 2404, the device receives an input of the annotation to be inserted at the location. For example, the device may open an annotation window in response to the user selecting the annotation icon or starting to write or drawn annotation over the content. The user may complete the annotation by writing or dawning within the annotation window. In some cases, the user my scroll or increase the size of the annotation window to accommodate the length of the annotation being inserted.

At 2406, the device receives an input to insert the annotation. For example, upon completion of the annotation, the user may close the annotation window causing the notes, comments, or drawings displayed in the annotation window to be inserted as an annotation at the location. In other examples, the user may complete the annotation and cause the annotation to be inserted by removing the stylus or other input device from the display.

At 2408, the device arranges the annotation at the location. For example, the device may insert or anchor the annotation into the content item at the desired location. In some cases, the device may arrange the annotation in a layer, such as an annotation layer, above the content of the content item. In some examples, the annotation may be anchored or associated with a particular word, image, or graphic within the content and the device may arrange the annotation at a location proximate or adjacent to the associated word, image, or graphic.

At 2410, the device reflows the content around the annotation. For example, the once the annotation is arranged on the display, the device may refresh the content (e.g., the texts and images), such that the annotation appears in-line or within the area of the display associated with displaying the content. In some cases, the device may cause a particular word, image, or graphic to appear adjacent to the annotation when the content is reflowed. For instance, often times the annotation's meaning may be determined based at least in part on the context of the content displayed near or adjacent to the annotation. Thus, in these instances, the device may reflow the content around the annotation, such that the annotation appears adjacent to any associated content.

Figure 25:
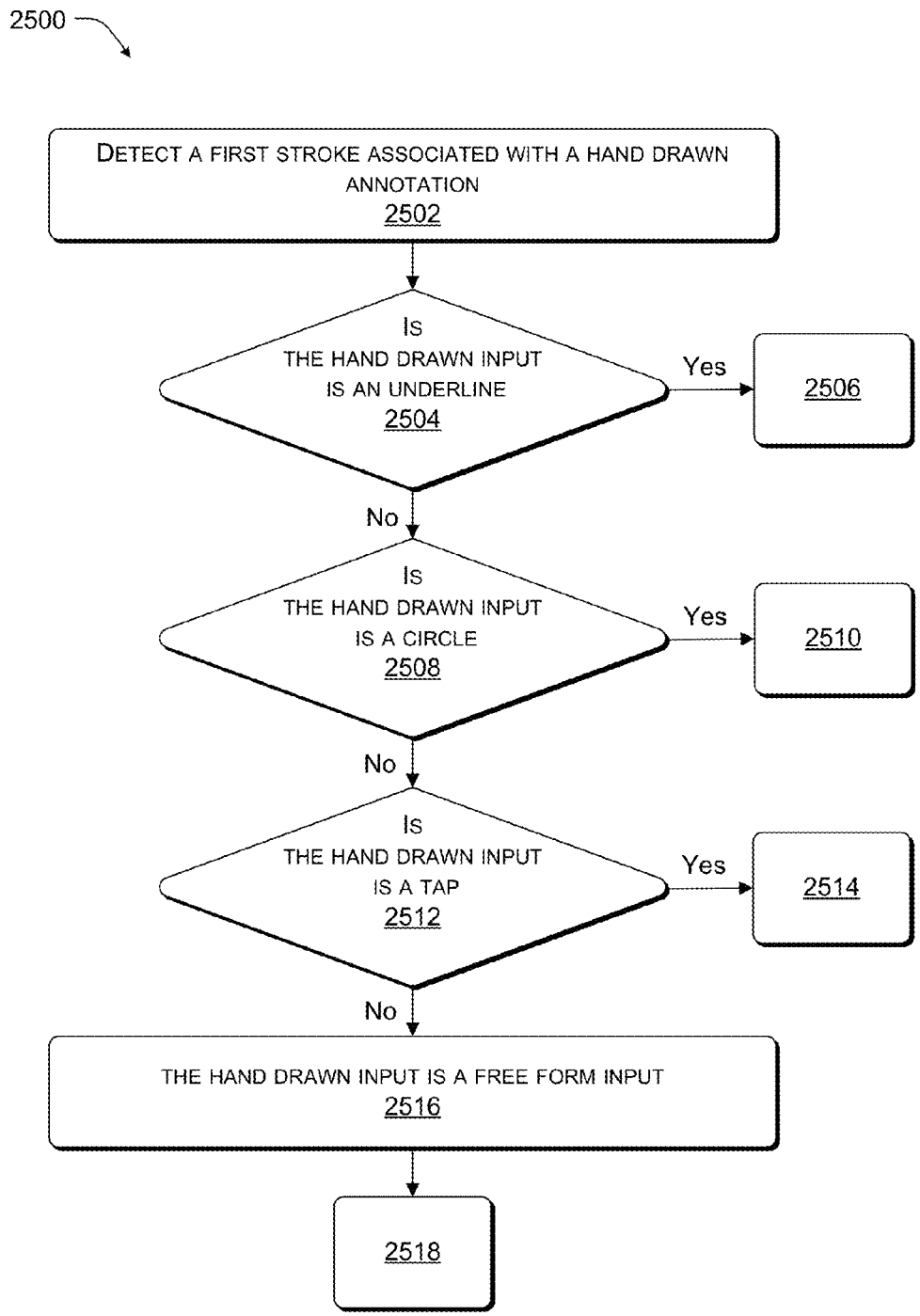
FIG. 25 illustrates an example flow diagram showing an illustrative process for determining a type of annotation.

FIG. 25 illustrates an example flow diagram showing an illustrative process 2500 for determining a type of annotation. For example, the annotation may be a hand-drawn annotation as described above with respect to FIGS. 1-5, an underline as described above with respect to FIGS. 9 and 14, a circle as described above with respect to FIGS. 10 and 11, and/or a tap as described above with respect to FIGS. 6-8.

At 2502, a device, such as device 102 of FIGS. 1-23, detects a first stroke associated with a hand-drawn annotation. For example, the first stroke may be a first line associated with a letter of a hand written annotation, a first line associated with a hand-drawn image, an underline, circle, or even a tap at a particular location of the content displayed by the device.

At 2504, the device determines if the hand-drawn annotation is an underline. In one implementation, the device may analyze characteristics the first stroke to determine if the stroke is indicative of an underline input. For example, the device may determine if the stroke has as relative or a single major direction, the location of the stroke with respect to the content (e.g., is the stroke located between two lines of text), the length of the stroke, among others. If the device determines that the stroke is an underline input, the process 2500 proceeds to 2506, which is described in more detail below with respect to FIG. 26.

At 2508, the device determines if the hand-drawn annotation is a circle. In one implementation, the device may analyze characteristics the first stroke to determine if the stroke is indicative of a circle input. For example, the device may determine if the start and end point of stroke are relative close together, the location of the stroke with respect to the content (e.g., is the stroke located around a portion of the content), the amount of change associated with the direction of the first stroke, among others. If the device determines that the stroke is a circle input, the process 2500 proceeds to 2510, which is described in more detail below with respect to FIG. 27.

At 2512, the device determines if the hand-drawn annotation is a tap. In one implementation, the device may analyze characteristics the first stroke to determine if the stroke is indicative of a tap input. For example, the device may determine a relative length or shortness of the stroke, the location of the stroke with respect to the content (e.g., on top of a single word, sentence, or image), the amount of time the input device (e.g., the stylus or finger) is in contact with the display, among others. If the device determines that the stroke is a tap, the process 2500 proceeds to 2514, which is described in more detail below with respect to FIG. 28.

At 2516, the device determines that the hand-drawn input is a free from input or text/image based annotation and the process 2500 proceeds to 2518 that is described in more detail below with respect to FIGS. 29 and 30. In the illustrated example, the process 3500 causes the device to rule out predefined inputs before determining that the stroke is associated with a free form input. While the illustrated example, includes three predefined inputs (e.g., underline, circle, and tap), the device may be configured to detect any number of predefined inputs, for example, a star, exclamation point, bracket, highlight, etc.

Figure 26:
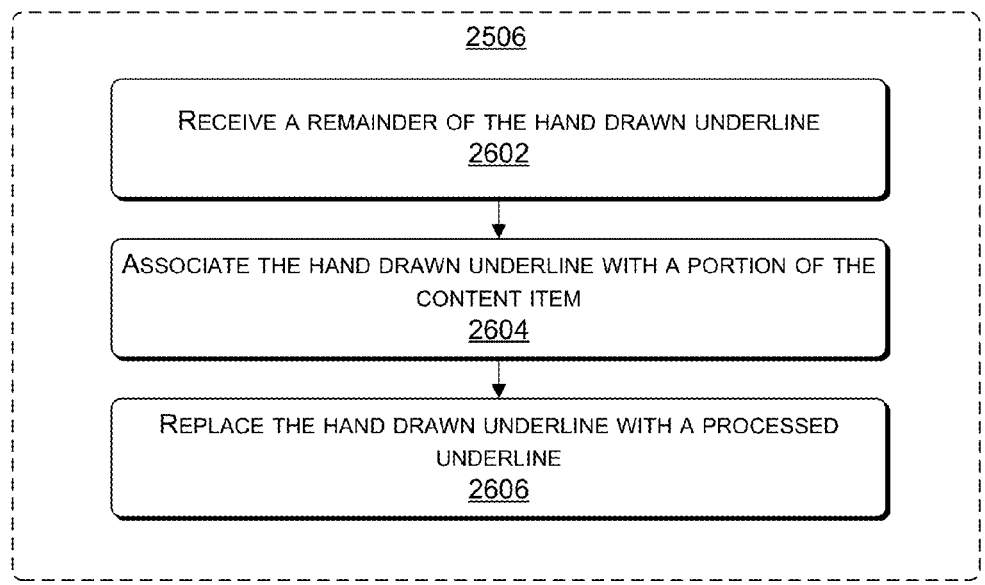
FIG. 26 illustrates an example flow diagram showing an illustrative process for emphasizing a portion with an underline.

FIG. 26 illustrates an example flow diagram showing an illustrative process 2600 for emphasizing a portion with an underline. In general, the device determines that the annotation is related to underling a portion of the content displayed based at least in part on a direction of the first stroke of the underline, a number of pixels associated with the first stroke, the length of the first stroke, the location of the first stroke with respect to the displayed content, among others, as described above with respect to FIG. 25.

For instance, in some devices, one or more pixels may be associated with a touch input or a touch sensor input coordinate. In some cases, the device may extract a center point associated with the first stroke based on an analysis of the movement associated with the first stroke. In this manner, the central pixels of the first stroke may be associated with the touch input. Once the central pixels are associated with a touch input, the device is able to determine whether or not the central pixels are in-line with the text being displayed, between lines of text being displayed, around an image being displayed, and/or otherwise associated/unassociated with an object being displayed. In some cases, the device may analyze number of pixels to closest word or object in horizontal line and the number of pixels to the closest word in a vertical line to identify a nearest word or object.

At 2602, the device receives a remainder of the hand-drawn underline. For example, the first stroke may be associated with a first line of content to be underlined and the user may proceed to underline additional lines and/or portions of the content following the first stroke. Therefore, the device may continue to wait and receive additional strokes that are associated with the underline until, for example, the user has removed the stylus or finger from the display of the device for a predetermined amount of time (e.g., 5 or more seconds).

At 2604, the device associated the hand-drawn underline with a portion of the content item. For example, the device may associate the hand-drawn underline with the text or images located directly above the underline. In some cases, the device may determine that a particular word has been underlined based on a percentage of the overall word adjacent or immediately above the underline. In other cases, the device may extend the underline from edge to edge underneath the nearest line of text and allow the user to adjust the underline by dragging and/or pulling the underline to a desired position.

At 2606, the device replaces the hand-drawn underline with a processed or machine generated underline. For example, once the text, words, and/or other content is associated with the hand-drawn underline, the device may remove the hand-drawn underline and replace with processed lines to clean up the underline such that a user may easily determine which content the underline is associated with.

FIG. 27 illustrates an example flow diagram showing an illustrative process 2700 for emphasizing a portion with a circle. In general, the device determines that the annotation is related to circling a portion of the content displayed based at least in part on a direction or change in direction of the first stroke of the underline, a number of pixels associated with the first stroke, the length of the first stroke, the location of the first stroke with respect to the displayed content, the relative closeness of the start and end point of the stroke, among others, as described above with respect to FIG. 25.

At 2702, the device extends the circle from the left edge of the display to the right edge of the display. For example, it is unlikely that a user would desire to circle the middle portion or more than one full line of text as rendered on the display. Therefore, the device first extends the circle from edge to edge to more accurately capture the text or content being emphasized by the circular annotation.

At 2704, the device associates the hand-drawn circle with a portion of the content item. For example, the device may determine that the content substantially within the circle following the extension of the circle from edge to edge should be associated with each other. In some cases, the hand-drawn circle may cross through or be positioned over content displayed by the device. In these cases, the device may determine whether or not to associated the partially circle content based at least in part on a percentage of each word that is within the area associated with the hand-drawn circle and the percentage of each word that is outside of the area associated with the circle.

At 2706, the device replaces the hand-drawn circle with a processed circle. For example, once the text, words, and/or other content is associated with the hand-drawn circle, the device may remove the hand-drawn circle and replace with processed lines to clean up the circle such that a user may easily determine which content the circle is associated with.

Figure 28:
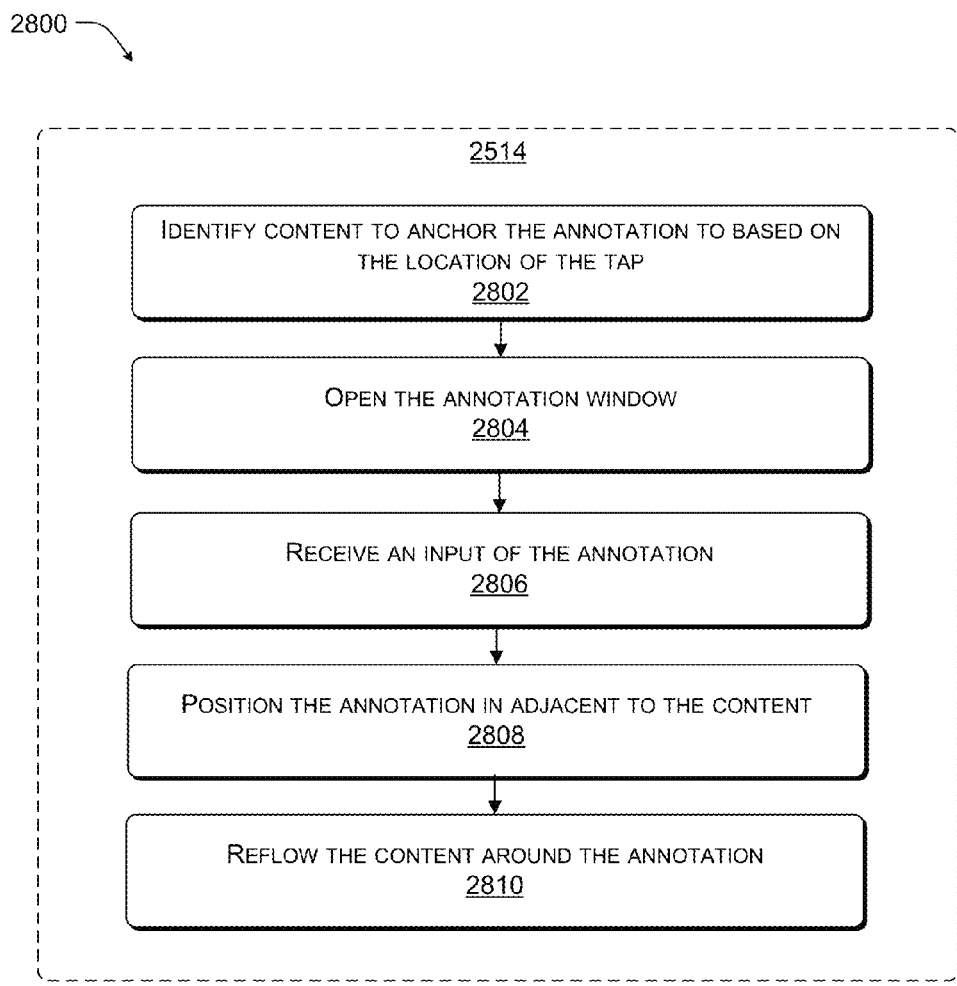
FIG. 28 illustrates an example flow diagram showing an illustrative process for anchoring an annotation to particular content.

FIG. 28 illustrates an example flow diagram showing an illustrative process 2800 for anchoring an annotation to particular content presented on the display. In general, the device determines that the annotation is related to tap based at least in part on a number of pixels associated with the first stroke, the length of the first stroke, time duration associated with the first stroke, the location of the first stroke with respect to the displayed content, among others, as described above with respect to FIG. 25.

At 2802, the device identifies content to anchor the annotation to based on the location of the tap. For example, the device may select the nearest word to the location of the tap to associate with the annotation. In other examples, the device may select the top or starting point of the first stroke and identify a word or image that is nearest to the start point to associate with the annotation.

At 2804, the device opens the annotation window. For example, the annotation window may be presented on the display to provide a user with additional white space in which to add additional handwritten notes, comments, and/ or drawings to the annotation. In some cases, the annotation window may be scrollable independent of the content, such that if the user runs out of room within the annotation window the user may drag the white space associated with the annotation window 302 to reveal additional white space for adding hand written or free form annotations.

At 2806, the device receives an input of the annotation, for example, via the annotation window. The annotation may include additional notes and or drawings to associate with the word or image identified with respect to 2802. In some specific implementations, the device may receive inputs by communicating with an active stylus configured to exchange data related to the user inputs with the device.

At 2808, the device positions the annotation adjacent to the content (e.g., the associated word or image). For example, the device may position the annotation with respect to the associated word or image before reflowing or refreshing the content displayed.

At 2810, the device reflows the content around the annotation. For example, once the annotation is anchored, the device may reflow the content such that the annotation appears in-line or within an area associated with displaying the content. Additionally, the device may reflow the content such that the annotation appears both in-line and adjacent to the content identified as the nearest content. In this manner, the significance of the annotation may be maintained even if the meaning of the annotation is tied to the meaning of the adjacent content.

Figure 29:
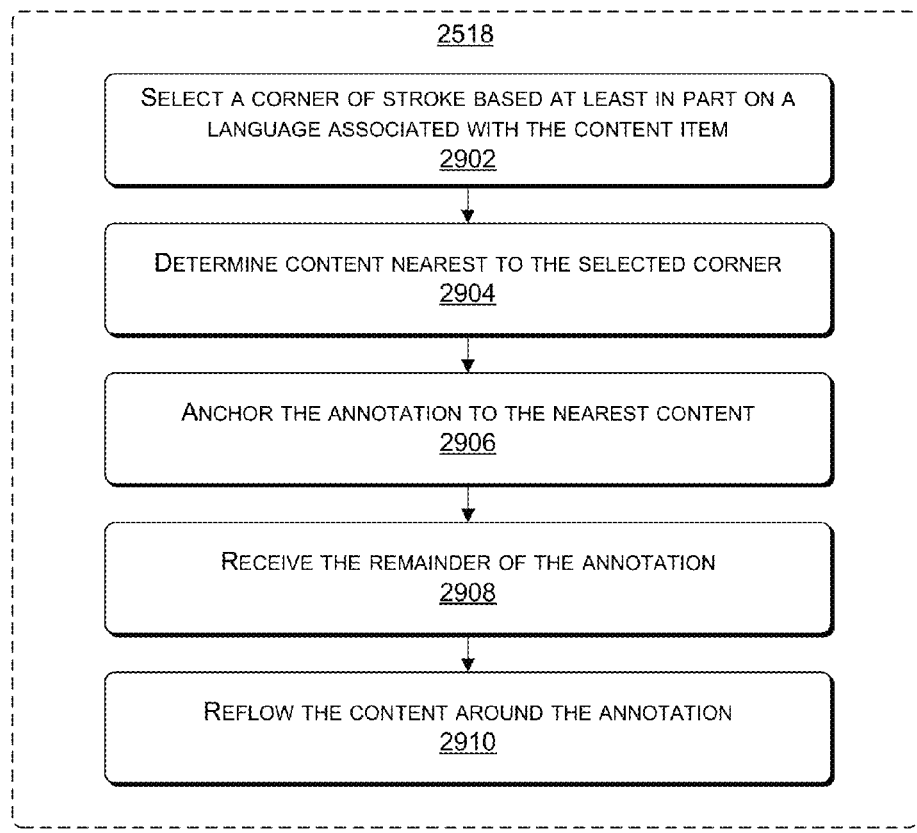
FIG. 29 illustrates an example flow diagram showing an illustrative process for anchoring an annotation to particular content.

FIG. 29 illustrates an example flow diagram showing an illustrative process 2900 for anchoring an annotation to particular content. For example, as discussed above, sometimes the annotation's meaning may be determined based at least in part on the context of the content displayed near or adjacent to the annotation. In these examples, the device may reflow the content around the annotation, such that the annotation appears near or adjacent to the anchored or associated content to help in retaining the meaning of the annotation as the annotation is viewed by different users on different devices with different displays.

In general, the device determines that the annotation is related to a free form annotation when the annotation does not qualify as one or more of the predetermined type of annotation, such as underline, circle, and tap as described above with respect to FIG. 25. In one example, described below, the device anchors the free form annotation based on the first stroke received as part of the process 2500 of FIG. 25.

At 2902, the device selects a corner of the first stroke based at least in part on a language associated with the content item. For example, if the language is a Latin based language, such as English, the device may select the top left hand corner of the first stroke. In other situations, such as when the language is Japanese, the device may select to the top right hand corner of the first stroke. In some particular implementations, the device may also select the starting point of the stroke, the end point of the stroke, the highest point or corner of the first stroke, the lowest portions or corner of the stroke, the point closets to the center of the display, among other positions or pixels associated with the stroke.

At 2904, the device determines content nearest to the selected corner of the first stroke. For example, the device may select the nearest word, sentence, paragraph, caption, image, or etc. to the selected corner of the first stroke. In some implementations, the granularity of the content selected may be determined by the device, for example, based on the size of the display, amount of content, type of content, subject matter of the content, etc. In other implementations, the granularity of the content selected may be determined by the user, for example, via one or more user settings associated with the content item, the device, a user account, among others.

At 2906, the device anchors or associates the annotation to the nearest content. For example, the device may locate the annotation at a position on the display, such that the annotation is adjacent or near by the associated content. In one implementation, the device may arrange the annotation relative to the display and the associated content in a layer different from the layer associated with the content. In this way, the device may allow the user to turn the annotation layer on and off.

At 2908, the device receives the remainder of the annotation. For example, the first stroke may be part of a single letter of a much longer annotation that the user is inserting. In some instances, the device receives a remainder of the annotation via an annotation window opened in response to detecting the first stroke.

At 2910, the device reflows the content around the annotation. For example, once the annotation is anchored, the device may reflow the content such that the annotation appears in-line or within an area associated with displaying the content. Additionally, the device may reflow the content such that the annotation appears both in-line and adjacent to the content identified as the nearest content. In this manner, the significance of the annotation may be maintained even if the meaning of the annotation is tied to the meaning of the corresponding content.

Figure 30:
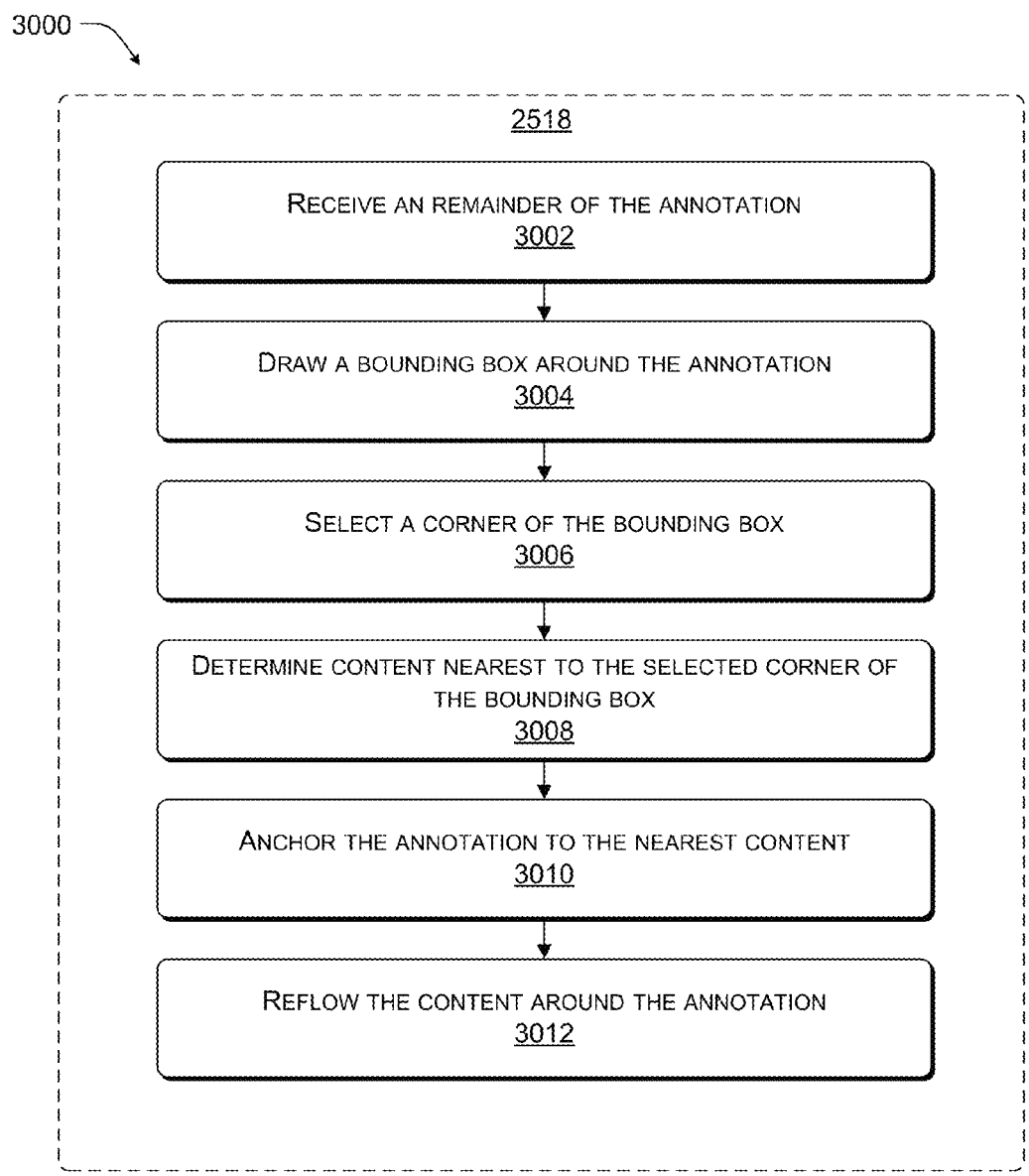
FIG. 30 illustrates an example flow diagram showing an illustrative process for anchoring an annotation to particular content.

FIG. 30 illustrates an example flow diagram showing an illustrative process 3000 for anchoring an annotation to particular content. For example, as discussed above, sometimes the annotation's meaning may be determined based at least in part on the context of the content displayed near or adjacent to the annotation. In these examples, the device may reflow the content around the annotation, such that the annotation appears near or adjacent to the anchored or associated content to help in retaining the meaning of the annotation as the annotation is viewed by different users on different devices with different displays.

At 3002, the device receives an input to annotate content displayed. For example, the user may have selected an annotation icon in response to adding emphasis to the content or tapping a stylus on the display and instated an annotation using the annotation window. In other examples, the user may have written or drawn the annotation directly over the displayed content. In both examples, the user selects a location or portion of the content to associate with annotation.

At 3004, the device draws a bounding box around the annotation. For example, the device may insert the annotation over the content displayed when the user closes the annotation or the user may have written the annotation directly over the content. In either case, the device may determine an area or box associated with the annotation, such that when the content is reflowed around the annotation the entire annotation is viewable by the user.

At 3006, the device selects a corner of the bounding box. For example, the device may select the corner furthest from the edge of the display. In this example, the device may compare a distance between the top of the bounding box and the top edge of the display with a distance between the bottom of the bounding box and the bottom edge of the display. The device may then select either the top side of the bounding box or the bottom side of the bounding box based on the comparison of the distance (e.g., the side of the bounding box with the larger distance from the edge of the display may be selected). The device may also compare the a distance between the left side of the bounding box and a left edge of the display to a distance between the right side of the bounding box to a right edge of the display and again pick the side of the bounding box associated with the greater distance. In this way, the device may select the corner (i.e., top right, top left, bottom right, or bottom left) closest to the center of the display.

In other implementations, the device may be configured to select a predetermined corner, such as the top left corner. In some cases, the predetermined corner may be configurable by the user or selected by the user at the time the annotation is added to the content. For example, the device my display the bounding box to the user and request the user to select a corner of the bounding box nearest to the content the user desires to associate with the annotation.

At 3008, the device determines the content nearest to the selected corner of the bounding box. For example, the device may select the nearest word, sentence, paragraph, caption, image, or etc. to the selected corner of the bounding box. In some implementations, the granularity of the content selected may be determined by the device, for example, based on the size of the display, amount of content, type of content, subject matter of the content, etc. In other implementations, the granularity of the content selected may be determined by the user, for example, via one or more user settings associated with the content item, the device, a user account, among others.

At 3010, the device anchors or associates the annotation to the nearest content. For example, the device may locate the annotation at a position on the display, such that the annotation is adjacent or near by the associated content. In one implementation, the device may arrange the annotation relative to the display and the associated content in a layer different from the layer associated with the content. In this way, the device may allow the user to turn the annotation layer on and off.

At 3012, the device reflows the content around the annotation. For example, once the annotation is anchored to the selected content, the device may reflow the content such that the annotation appears in-line or within an area associated with displaying the content. Additionally, the device may reflow the content such that the annotation appears both in-line and adjacent to the associated content. In this manner, the significance of the annotation may be maintained even if the meaning of the annotation is tied to particular content.

Figure 31:
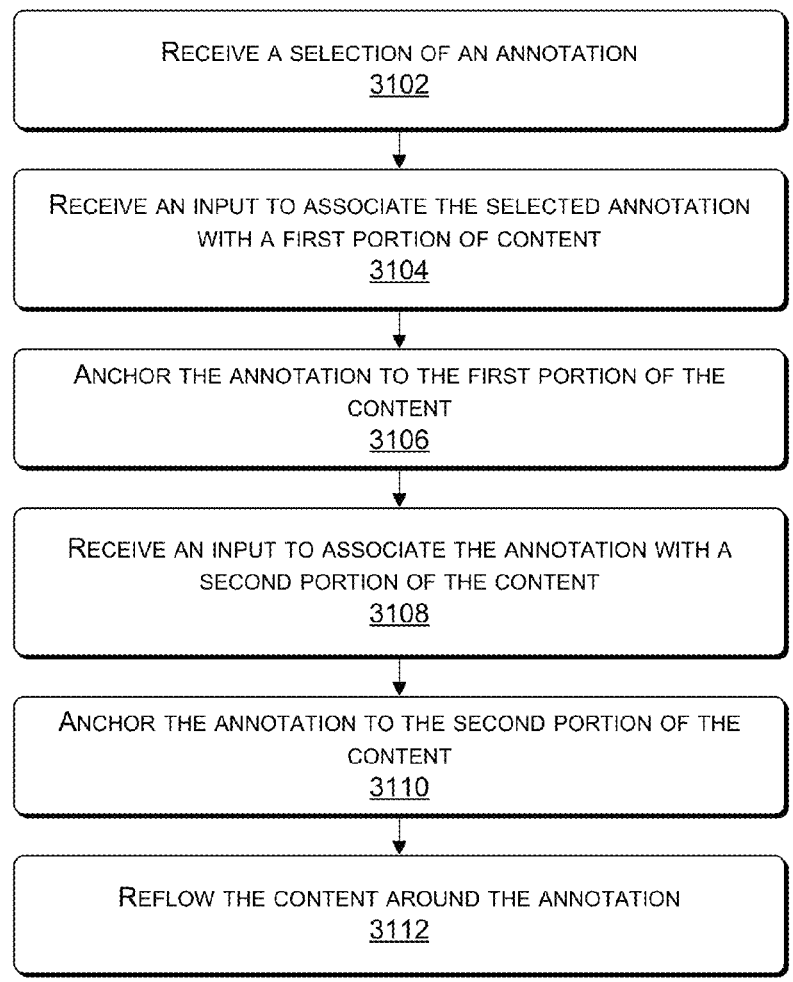
FIG. 31 illustrates an example flow diagram showing an illustrative process for associating content with an annotation.

FIG. 31 illustrates an example flow diagram showing an illustrative process 2300 for associating content with an annotation. For example, in some contexts the user may desire to anchor the annotation to a particular portion of the content item or to one or more portions of the content item. For instance, is marking an electronic version of a text book with annotations indicating portion of the content item on a test, the user may desire to anchor the same annotation to each of the portions on the test. At 3102, the device receives a selection of an annotation presented on the display of the device. For example, the user may select the annotation by tapping or pressing on a location of the display in which the annotation is currently presented.

At 3104, the device receives an input to associate the selected annotation with a first portion of the content. For example, the user may select the annotation by tapping or pressing on the location at which the annotation is displayed and then associate the annotation with the first portion by drawing an arrow from the annotation to the first portion. In another example, the user may associate the first portion and the annotation by tapping on the annotation and the first portion of the content in series. In some implementations, the user may associate the annotation with the first portion by selecting the annotation and underlining, circling, or bracketing the first portion of the content.

At 3106, the device anchors the annotation to the first portion of the content item. For example, the device may be configured to draw a bounding box around the annotation, select a corner of the annotation (e.g., the corner nearest the first portion), and anchor the annotation to a word of the first portion nearest to the selected corner. In other examples, the device may request the user to select a word, sentence, or graphic of the first portion to which to anchor the annotation.

At 3108, the device receives an input to associate the selected annotation with a second portion of the content. For example, the user may select the annotation by tapping or pressing on the location at which the annotation is displayed and then associate the annotation with the second portion by drawing an arrow from the annotation to the second portion. In another example, the user may associate the second portion and the annotation by tapping on the annotation and the first portion of the content in series. In some implementations, the user may associate the annotation with the second portion by selecting the annotation and then underlining, circling, or bracketing the second portion of the content.

At 3110, the device anchors the annotation to the second portion of the content item. For example, the device may be configured to draw a bounding box around the annotation, select a corner of the annotation (e.g., the corner nearest the second portion), and anchor the annotation to a word of the second portion nearest to the selected corner. In other examples, the device may request the user to select a word, sentence, or graphic of the second portion to which to anchor the annotation.

In some examples, the first and second portions may be close enough together that the annotation may be located or arranged near or adjacent to both portions (e.g., as illustrated with regards to FIG. 14). In these examples, the same annotation may be anchored to both the first portion and the second portion. In other examples, the first portion and the second portion may be relatively distance within the content item (e.g., on different pages of the content item). In these examples, the device may duplicate the annotation and anchor one of the duplicates to the first portion and a second one of the duplicates to the second portions. In this manner, the same annotation may be associated or anchored to multiple portions of the content item without the user having to manually re-enter or insert the annotation on each page that has content the user wants to associate with the annotation.

At 3112, the device reflows the content around the annotation (or annotation). For example, once the annotation is anchored to the first and second portions, the device may reflow the content such that the annotation appears in-line or within an area associated with displaying the content. Additionally, the device may reflow the content such that the annotation appears both in-line and adjacent to the first and second portions and/or duplicate the annotation and reflow the content around both duplicate annotations. In this manner, the significance of the annotation may be maintained even if the meaning of the annotation is tied to particular content.

Figure 32:
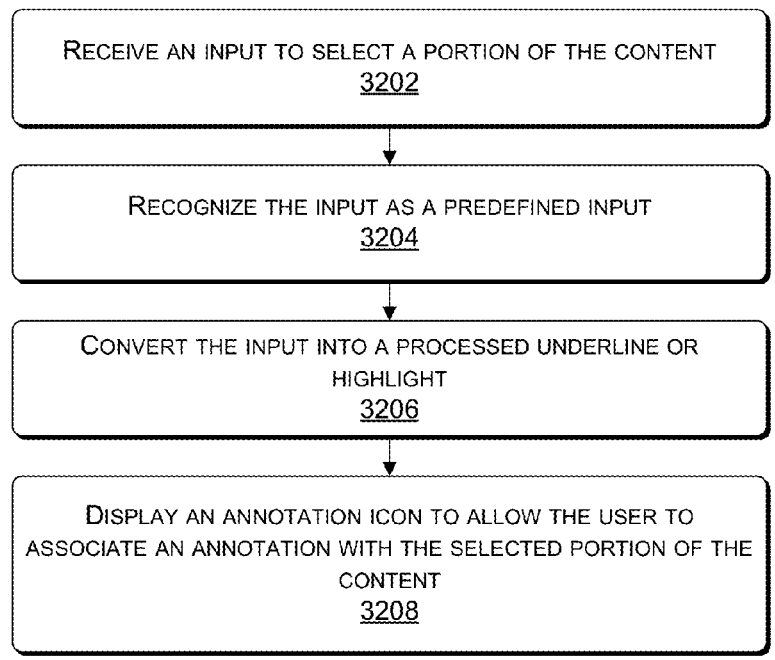
FIG. 32 illustrates an example flow diagram showing an illustrative process for emphasizing a portion of the content item.

FIG. 32 illustrates an example flow diagram showing an illustrative process 2400 for emphasizing a portion of the content item. For example, the user may attempt to draw attention to the portion of the content by underlining, circling, bracketing text, captions, or images within the content item. In other examples, the user may attempt to mark or flag a section as particularly important by staring or flagging or marking a particular passage, word, paragraph, or image.

At 3202, the device receives an input to select a portion of the content item. For example, the user may underline, circle, or bracket a portion of the text of the content item using the stylus. In other examples, the user may draw a star, circle, number, or exclamation point, or other distinguishing mark over or near the portion of the content.

At 3204, the device recognizes the input as a predefined input, for example an underline, circle, bracket, star, number, exclamation point, among others. In some examples, the predefined inputs may be defined by the device or the device operating system, by one or more applications presenting the content item, or by the content item (e.g., in metadata associated with the content item). In other examples, the predefined inputs may be user selected or user generated. For instance, the user may draw one or more distinguishing marks using the stylus and select an action from a list of available actions to associate with each distinguishing mark. In this manner, the user may define an underline as an input to emphasize the portion and the star as an input to flag the portion and to add the flag portion to the virtual notebook, a list of flagged portions, and/or to generate one or more flashcards from the portion.

At 3206, the device converts the input into a processed underline or highlight. In one implementation, the device may recognize an input (e.g., underlining, circling, or bracketing the portion) as an input to emphasize the portion and, in response, the device may covert the input into a processed underline or highlight to clearly identify the emphasized content. In other examples, the device may generate a processed circle or box around the portion, for instance, in some cases underlining may be inappropriate, such as if the portion is an image or graphic. In other implementations, the device may recognize the input (e.g., a star, number, or exclamation point) as an indication to flag the portion. In this implementation, the device may convert the hand-drawn star, number or exclamation point into a processed version inserted adjacent to the first word or top left corner of the portion. In some instances, the device may also emphasize the portion by generating a processed underline, circle, box, or highlight around the portion.

At 3208, the device display san annotation icon to allow the user to associate an annotation with the selected portion of the content. For example, the user may select the annotation icon to open an annotation window in which a hand-drawn annotation may be input. The annotation may then be inserted in-line with the portion when the user closes the annotation window, as described above.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A device comprising:
    a processor;
    memory coupled to the processor;
    a touch sensor coupled to the processor;
    a display coupled to the processor and configured to present content of an electronic book; and
    a user interface module stored in the memory and executable by the processor to:
        detect a first stroke of a hand-drawn user input, via the touch sensor; and
        at least partly in response to detecting the hand-drawn user input:
            determine the hand-drawn user input is not associated with an underline input, circle input, or tap input;
            determine that the hand-drawn user input is associated with a hand-drawn annotation when the first stroke is not associated with the underline input, the circle input, or the tap input;
            responsive to determining the hand-drawn user input is the hand-drawn annotation:
                select a corner of the first stroke based at least in part on a language associated with the electronic book, wherein the corner is a top left corner when the language is English;
                identify a word of the content, the word nearest the corner;
                associate the word with the hand-drawn annotation;
                receive an input of additional strokes associated with the hand-drawn annotation;
                position the hand-drawn annotation based on a height or width of the display and a location of the word relative to the content of the electronic book presented on the display; and
                reflow the content of the electronic book present on the display around the hand-drawn annotation to cause the annotation to appear adjacent to the word and in-line with the words of the electronic book presented on the display.

2. The device of claim 1, wherein the user interface module, responsive to determining the hand-drawn user input is an underline input, is further configured to:
    determine if the hand-drawn user annotation is associated with an underline input based at least in part on an a direction associated with the first stroke, a length of the first stroke, and a position of the first stroke;
    associate the first stroke and the additional strokes of the hand-drawn annotation with a portion of the content based at least in part on the position of the first stroke relative to an association of pixels on the display associated with the first stroke; and
    replace the first stroke and the additional strokes of the hand-drawn annotation with a processed underline.

3. The device of claim 1, wherein the user interface module, responsive to determining the hand-drawn user input is a circle input, is further configured to:
    determine if the hand-drawn user input is associated with a circle input based at least in part on a direction or change in direction of the first stroke, a length of the first stroke, a position of the first stroke with respect to the content of the electronic book present on the display determined by using an association of pixels to the first stroke, and a relative closeness of a starting and ending point of the first stroke;
    associate the first stroke with a portion of the content based at least in part on the position of the first stroke with respect to the content of the electronic book present on the display; and
    replace the first stroke with a processed circle.

4. The device of claim 3, wherein the user interface module, responsive to determining the hand-drawn user input is a circle input, is further configured to:

extend the first stroke from a left edge of the display to a right edge of the display.

5. The device of claim 1, wherein the reflowing of the content of the electronic book present on the display around the hand-drawn annotation further comprise, rendering the content presented on the display around the annotation to cause the annotation to appear adjacent to the word and at least partially surrounded by the content.

6. A method comprising:
under control of one or more computer systems configured with executable instructions,
receiving a first stroke associated with a touch input;
determining, based on the first stroke, a predetermined type of annotation associated with the touch input;
determining the predetermined type of annotation is a free form annotation;
associating the free form annotation with a word of content presented on a display of a device;
receiving a additional strokes associated with the touch input;
associating the free form annotation with the word based at least in part on a location of the word within the content; and
rendering the content to be presented on the display, the rendering including rendering the content presented on the display around the annotation to cause the annotation to appear adjacent to the word and at least partially surrounded by the content.

7. The method of claim 6, further comprising:
selecting a corner of the first stroke based at least in part on a language associated with the content presented on the display; and
determining a word nearest the corner as the word associated with the annotation.

8. The method of claim 6, wherein the receiving the additional strokes of the touch input comprises:
displaying an annotation icon;
receiving a selection of the annotation icon; and
opening an annotation window.

9. The method of claim 6, further comprising:
arranging the content to be displayed based at least in part on a plurality of layers included in the content;
storing words of the content within a text layer included in the layers; and
storing the annotation within an annotation layer included in the layers, the annotation layer being different from the text layer.

10. The method of claim 6, wherein the associating is based at least in part on dimensions associated with the display of the device presenting the content.

11. The method of claim 6, further comprising:
receiving a second touch input;
determining the second touch input is an underline input based at least in part on an analysis of a first stoke associated with the second touch input;
associating the first stroke of the second touch input with a portion of the content based at least in part on a position of the first stroke of the second touch input with respect to the content presented on the display; and
replacing the first stroke of the second touch input a processed underline.

12. The method of claim 6, further comprising:
receiving a second touch input;
determining the second touch input is an circle input based at least in part on an analysis of a first stoke associated with the second touch input;
associating the first stroke of the second touch input with a portion of the content based at least in part on a position of the first stroke of the second touch input with respect to the content presented on the display; and
replacing the first stroke of the second touch input with a processed circle.

13. The method of claim 12, further comprising extending the first stroke form a left edge of the display to a right edge of the display before replacing the first stroke of the second touch input with the processed circle.

14. The method of claim 6, further comprising:
receiving a second touch input;
determining the second touch input is an tap input based at least in part on an analysis of a first stoke associated with the second touch input;
identifying the word of the content to associate with the tap input based at least in part on a position of the first stroke of the second touch input with respect to the content presented on the display;
opening an annotation window to receive the annotation;
receiving an input of the free form annotation.

15. The method of claim 6, further comprising:
receiving a selection of the free form annotation;
receiving a selection of a second word of the content;
associating the second word with the free form annotation;
re-positioning the free form annotation at a second location adjacent to the second word; and
rendering the content to be presented on the display, the rendering including rendering the content presented on the display around the annotation to cause the annotation to appear adjacent to the second word and at least partially surrounded by the content.

16. One or more non-transitory computer-readable media having computer-executable instructions that, when executed by one or more processors, cause the one or more processors to perform operations comprising:
receiving a first stroke associated with a touch input;
determining, based on the first stroke a predetermined type of annotation associated with the touch input;
determining the predetermined type of annotation is associated with a hand-drawn annotation;
associating the hand-drawn annotation with a first word of a content item presented on a display;
receiving additional strokes associated with the hand-drawn annotation;
associating the hand-drawn annotation with the first word based at least in part a location of the first word within the the content item presented on the display; and
re-rendering the content item on the display to cause the hand-drawn annotation to appear adjacent to the first word and at least partially surrounded by text of the content item presented on the display.

17. The one or more computer-readable media as recited in claim 16, having computer-executable instructions that, when executed by the one or more processors, cause the one or more processors to perform operations comprising opening an annotation window in response to determining the predetermined type of annotation is associated with the hand-drawn annotation.

18. The one or more computer-readable media as recited in claim 16, having computer-executable instructions that, when executed by the one or more processors, cause the one or more processors to perform operations comprising:
- receiving a selection of the hand-drawn annotation;
- receiving a selection of second word of the content item;
- determining that the second word and the first word are further than a predefined distance apart;
- generating a duplicate hand-drawn annotation, the duplicate hand-drawn annotation being a copy of the hand-drawn annotation;
- associating the duplicate hand-drawn annotation with the second word; and
- positioning the duplicate hand-drawn annotation based at least in part a location of the second word within the content item presented on the display; and
- re-rendering the content item on the display to cause the duplicate hand-drawn annotation to appear adjacent to the second word and at least partially surrounded by the text of the content item presented on the display.

19. The one or more computer-readable media as recited in claim 16, wherein a position of the hand-drawn annotation is based at least in part on dimensions associated with the display.

20. The one or more computer-readable media as recited in claim 16, wherein a position of the hand-drawn annotation is based at least in part on a location associated with a second annotation associated with the words of the content item.

* * * * *